(12) United States Patent
Furcoiu et al.

(10) Patent No.: US 11,808,386 B2
(45) Date of Patent: Nov. 7, 2023

(54) MECHANICAL JOINT RESTRAINT

(71) Applicant: Mueller International, LLC, Atlanta, GA (US)

(72) Inventors: Aurelian Ioan Furcoiu, Oswego, IL (US); David Edward Woollums, Signal Mountain, TN (US)

(73) Assignee: Mueller International, LLC, Atlanta, GA (US)

( * ) Notice: Subject to any disclaimer, the term of this patent is extended or adjusted under 35 U.S.C. 154(b) by 336 days.

(21) Appl. No.: 16/990,384

(22) Filed: Aug. 11, 2020

(65) Prior Publication Data

US 2020/0370686 A1   Nov. 26, 2020

Related U.S. Application Data

(63) Continuation-in-part of application No. 16/386,627, filed on Apr. 17, 2019.

(51) Int. Cl.
| | | |
|---|---|---|
| *F16L 21/04* | (2006.01) | |
| *F16L 17/04* | (2006.01) | |
| *F16L 17/025* | (2006.01) | |

(52) U.S. Cl.
CPC ............. *F16L 21/04* (2013.01); *F16L 17/025* (2013.01); *F16L 17/04* (2013.01)

(58) Field of Classification Search
CPC ......... F16L 21/04; F16L 21/08; F16L 17/025; F16L 17/04
See application file for complete search history.

(56) References Cited

U.S. PATENT DOCUMENTS 1,861,372 A * 5/1932 Waters .................... F16L 21/04
                                                                                 285/383
1,979,255 A    11/1934 Engel et al.
(Continued)

FOREIGN PATENT DOCUMENTS

FR            697255         1/1931
FR           2830070         3/2003
(Continued)

OTHER PUBLICATIONS

Mueller Co; Brochure for The AquaGrip System, revised Mar. 2018, 4 pgs.
(Continued)

*Primary Examiner* — Matthew Troutman
*Assistant Examiner* — Fannie C Kee
(74) *Attorney, Agent, or Firm* — Taylor English Duma LLP

(57) ABSTRACT

A mechanical joint restraint includes: a gasket defining an inner surface and an outer surface, the inner surface defining a bore, the bore defining an axis therethrough, the gasket defining a first gasket end and a second gasket end; a gland defining a bore defining an axis and positioned axially outward from the gasket with respect to the first gasket end with the mechanical joint restraint in an assembled condition, the axis of the gland aligned collinearly with the axis of the gasket; a gripping ring positioned between the gasket and the gland, the gripping ring being a split ring defining a pair of circumferential ends and a gap therebetween; and a bridge engaging each of the pair of circumferential ends of the gripping ring and extending in a circumferential direction of the gripping ring across the gap therebetween with the mechanical joint restraint in the assembled condition.

20 Claims, 13 Drawing Sheets

(56) References Cited

U.S. PATENT DOCUMENTS

| | | | |
|---|---|---|---|
| 2,037,084 A | | 4/1936 | Moore |
| 2,148,038 A | * | 2/1939 | Raybould ............... F16L 21/04 277/620 |
| 2,394,351 A | | 2/1946 | Wurzburger |
| 2,693,374 A | * | 11/1954 | Wurzburger ............ F16L 17/04 277/622 |
| 3,484,123 A | * | 12/1969 | Velden .................... F16L 17/04 285/341 |
| 3,510,140 A | * | 5/1970 | Theodor ................. F16L 17/04 285/344 |
| 3,787,080 A | * | 1/1974 | Daniel .................... F16L 17/04 285/341 |
| 3,889,989 A | | 6/1975 | Legris |
| 3,986,731 A | * | 10/1976 | DeHoff ................... F16L 21/04 285/356 |
| 4,230,157 A | * | 10/1980 | Larsen ................... F16L 21/04 138/155 |
| 4,380,348 A | | 4/1983 | Swartz |
| 4,544,188 A | | 10/1985 | Dugger |
| 4,602,793 A | * | 7/1986 | Andrick ................ F16L 17/025 285/379 |
| 4,858,968 A | | 8/1989 | Moebius |
| 4,867,488 A | | 9/1989 | Jones |
| 5,297,826 A | | 3/1994 | Percebois et al. |
| 5,398,980 A | | 3/1995 | Hunter |
| 5,437,481 A | | 8/1995 | Spears et al. |
| 6,019,396 A | | 2/2000 | Saito et al. |
| 6,220,635 B1 | * | 4/2001 | Vitel ...................... F16L 21/08 285/337 |
| 6,371,530 B1 | | 4/2002 | Sato et al. |
| 6,457,718 B1 | | 10/2002 | Quesada |
| 9,441,771 B2 | | 9/2016 | German |
| 10,018,290 B2 | | 7/2018 | Kishi et al. |
| 11,473,705 B2 | | 10/2022 | Furcoiu |
| 11,566,732 B2 | | 1/2023 | Furcoiu et al. |
| 2002/0017789 A1 | | 2/2002 | Holmes |
| 2004/0232699 A1 | | 11/2004 | Jones |
| 2005/0040645 A1 | * | 2/2005 | Jones ...................... F16L 21/08 285/374 |
| 2005/0194784 A1 | | 9/2005 | Jones et al. |
| 2011/0084484 A1 | | 4/2011 | German et al. |
| 2011/0210543 A1 | * | 9/2011 | German ................. F16L 21/04 285/330 |
| 2013/0193685 A1 | * | 8/2013 | Bird ........................ F16L 21/04 285/337 |
| 2017/0030489 A1 | | 2/2017 | Decesare et al. |
| 2018/0306361 A1 | | 10/2018 | Furcoiu |
| 2020/0063900 A1 | | 2/2020 | Furcoiu |
| 2020/0332933 A1 | | 10/2020 | Furcoiu et al. |
| 2020/0370686 A1 | | 11/2020 | Furcoiu et al. |
| 2023/0132678 A1 | | 5/2023 | Furcoiu et al. |

FOREIGN PATENT DOCUMENTS

| | | | |
|---|---|---|---|
| GB | 2346185 | | 8/2000 |
| KR | 20140062744 | | 5/2014 |
| KR | 101828783 B1 | * | 2/2018 .............. F16L 21/04 |
| WO | 2020040995 | | 2/2020 |

OTHER PUBLICATIONS

The Ford Meter Box Company, Inc.; Product Announcement for The Ford Uni-Ring, published Jun. 2018, 1 pg.

The Ford Meter Box Company, Inc.; Specification Sheet for MJ Gripping Style Restraint—(FUR-C-x-I style), published Feb. 7, 2019, 1 pg.

The Ford Meter Box Company, Inc.; Specification Sheet for MJ Gripping Style Restraint—(FUR-C-x-RB-I style), published Feb. 6, 2019, 1 pg.

Furcoiu, Aurelian Ioan; Restriction Requirement for U.S. Appl. No. 16/386,627, filed Apr. 17, 2019, dated Mar. 16, 2021, 5 pgs.

Furcoiu, Aurelian Ioan; Final Office Action for U.S. Appl. No. 16/109,204, filed Aug. 22, 2018, dated Feb. 1, 2022, 27 pgs.

Furcoiu, Aurelian Ioan; Applicant-Initiated Interview Summary for U.S. Appl. No. 16/386,627, filed Apr. 17, 2019, dated Feb. 7, 2022, 2 pgs.

Furcoiu, Aurelian Ioan; Advisory Action for U.S. Appl. No. 16/109,204, filed Aug. 22, 2018, dated Aug. 19, 2021, 10 pgs.

Furcoiu, Aurelian Ioan; Final Office Action for U.S. Appl. No. 16/109,204, filed Aug. 22, 2018, dated Jun. 14, 2021, 22 pgs.

Furcoiu, Aurelian Ioan; Non-Final Office Action for U.S. Appl. No. 16/109,204, filed Aug. 22, 2018, dated Dec. 22, 2020, 65 pgs.

Furcoiu, Aurelian Ioan; Non-Final Office Action for U.S. Appl. No. 16/109,204, filed Aug. 22, 2018, dated Sep. 23, 2021, 19 pgs.

Furcoiu, Aurelian Ioan; Requirement for Restriction/Election for U.S. Appl. No. 16/109,204, filed Aug. 22, 2018, dated Aug. 22, 2020, 6 pgs.

Furcoiu, Aurelian Ioan; Non-Final Office Action for U.S. Appl. No. 16/386,627, filed Apr. 17, 2019, dated Nov. 17, 2021, 24 pgs.

Furcoiu, Aurelian Ioan; International Preliminary Report on Patentability for PCT Application No. PCT/US19/45453, filed Aug. 7, 2019, dated Mar. 4, 2021, 8 pgs.

Furcoiu, Aurelian Ioan; International Search Report and Written Opinion for PCT Application No. PCT/US19/45453, filed Aug. 7, 2019, dated Oct. 28, 2019, 9 pgs.

Furcoiu, Aurelian Ioan; Notice of Allowance for U.S. Appl. No. 16/386,627, filed Apr. 17, 2019, dated Sep. 29, 2022, 10 pgs.

Furcoiu, Aurelian Ioan; Notice of Allowance for U.S. Appl. No. 16/109,204, filed Aug. 22, 2018, dated Aug. 29, 2022, 11 pgs.

Furcoiu, Aurelian Ioan; Final Office Action for U.S. Appl. No. 16/386,627, filed Apr. 17, 2019, dated Jun. 16, 2022, 22 pgs.

Furcoiu, Aurelian Ioan; Non-Final Office Action for U.S. Appl. No. 16/109,204, filed Aug. 22, 2018, dated Jun. 6, 2022, 24 pgs.

Furcoiu, Aurelian Ioan; Non-Final Office Action for U.S. Appl. No. 18/146,681, filed Dec. 27, 2022, dated Jun. 7, 2023, 20 pgs.

* cited by examiner

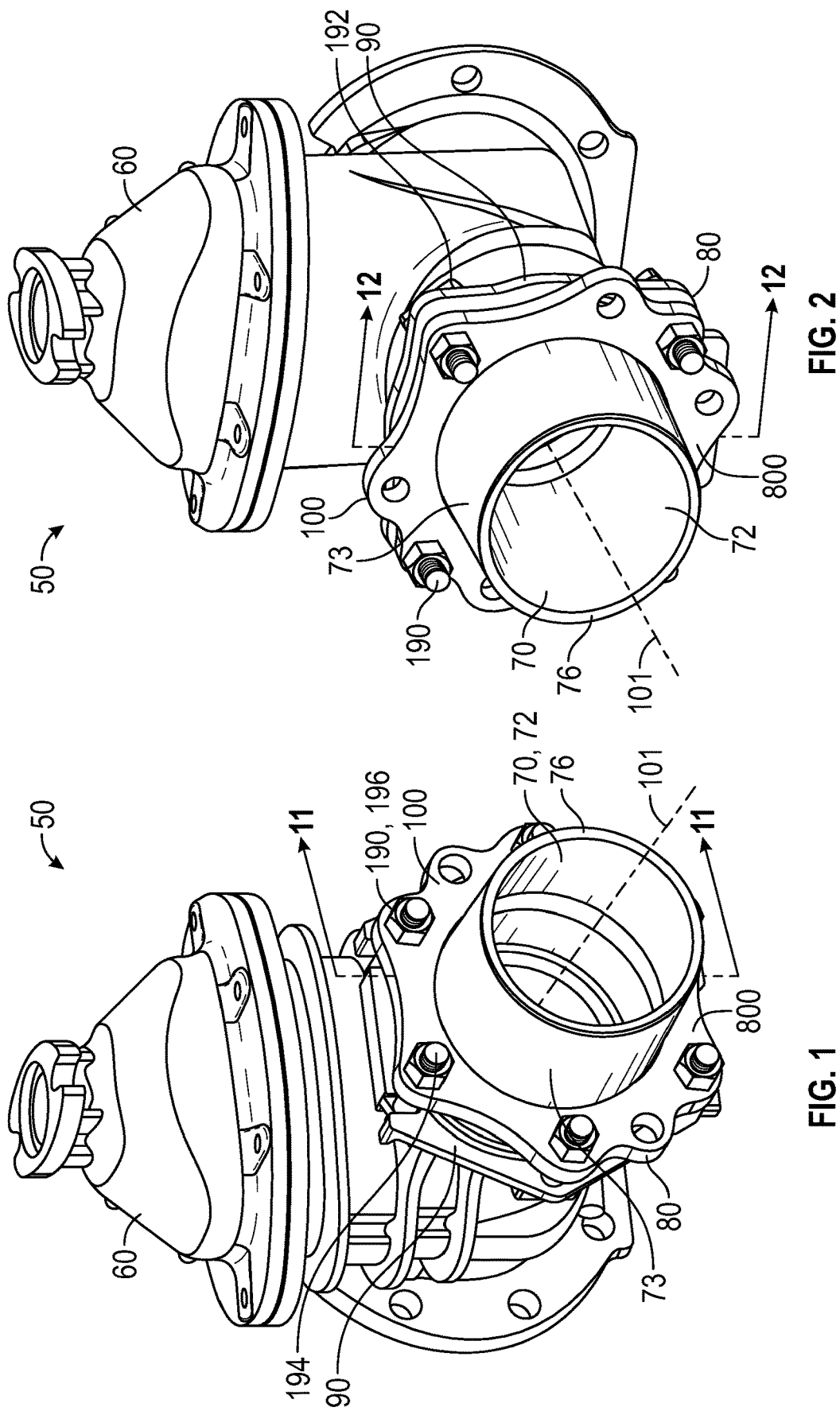

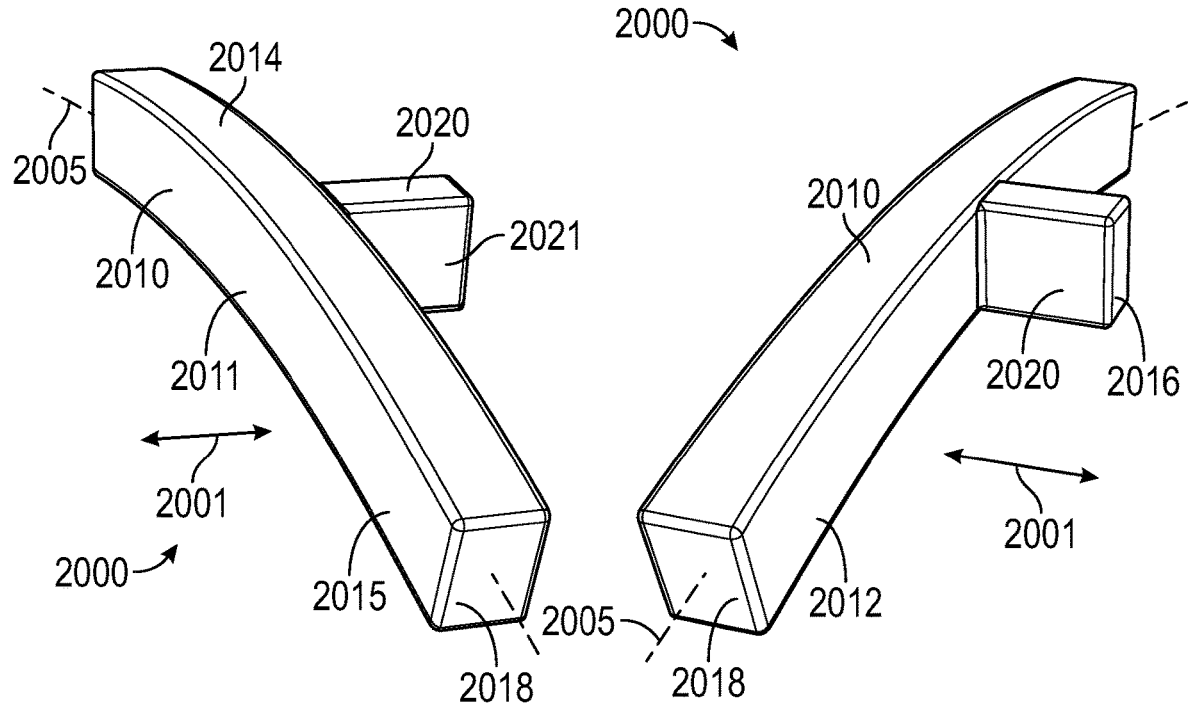
FIG. 20        FIG. 21
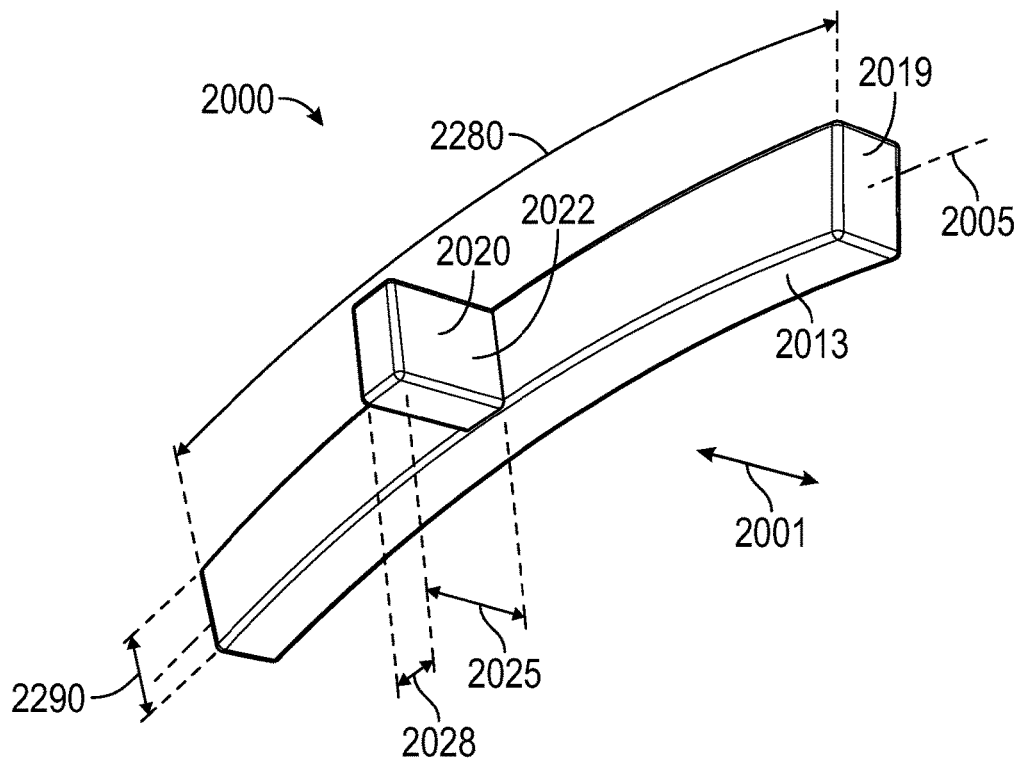
FIG. 22

MECHANICAL JOINT RESTRAINT

REFERENCE TO RELATED APPLICATIONS

This application is a continuation-in-part of U.S. application Ser. No. 16/386,627, filed Apr. 17, 2019, which is hereby specifically incorporated by reference herein in its entirety.

TECHNICAL FIELD

Field of Use

This disclosure relates to joining elements of pipe systems. More specifically, this disclosure relates to mechanical joint restraints for joining piping elements of pipe systems.

Related Art

A mechanical joint can be used to join a pipe length to a piping element such as a valve configured to open and close; a fitting such as a tee, an elbow, or a coupling; or another pipe length. In some aspects, the mechanical joint can comprise a female socket, a gland, a gasket, and the pipe length.

The mechanical joint is popular because it can work with a plain end of the pipe length, unlike a grooved connection or flanged connection, which must generally be formed with special tooling. Being able to use the plain end as-is allows for the pipe length to be cut to size in a field installation without the time and field equipment necessary to weld a flange to the plain end or to cut or roll a new groove in the plain end. Mechanical joints can generally be assembled with common hand tools such as a wrench or ratchet but can sometimes be assembled incorrectly and can require time-consuming measuring and marking of the pipe length to ensure a correct insertion depth.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a mechanical joint restraint comprising: a gasket defining an inner surface and an outer surface, the inner surface defining a bore, the bore defining an axis therethrough, the gasket defining a first gasket end and a second gasket end; a gland defining a bore defining an axis and positioned axially outward from the gasket with respect to the first gasket end with the mechanical joint restraint in an assembled condition, the axis of the gland aligned collinearly with the axis of the gasket; a gripping ring positioned between the gasket and the gland, the gripping ring being a split ring defining a pair of circumferential ends and a gap therebetween; and a bridge engaging each of the pair of circumferential ends of the gripping ring and extending in a circumferential direction of the gripping ring across the gap therebetween with the mechanical joint restraint in the assembled condition.

In a further aspect, disclosed is a mechanical joint comprising: a piping element comprising a flange and defining a socket; a pipe length positioned inside the socket; and a mechanical joint restraint securing the pipe length to the piping element, the mechanical joint restraint comprising a gasket defining an inner surface and an outer surface, the inner surface defining a bore, the bore defining an axis therethrough, the gasket defining a first gasket end and a second gasket end, the gasket defining a rib on one of an inner surface and an outer surface of the gasket.

In yet another aspect, disclosed is a method of using a mechanical joint restraint, the method comprising: assembling the mechanical joint restraint to each of a pipe length and a socket of a piping element, the mechanical joint restraint defining an axis and comprising: a gasket defining a first gasket end engaging the socket and a second gasket end positioned distal from the first gasket end in an axial direction along the axis of the mechanical joint restraint; a gland positioned axially outward from the gasket with respect to the first gasket end; a gripping ring positioned between the gasket and the gland, the gripping ring being a split ring defining a pair of circumferential ends and a gap therebetween; and a bridge engaging each of the pair of circumferential ends of the gripping ring and extending in a circumferential direction of the gripping ring across the gap therebetween; and drawing the gland of the mechanical joint restraint towards a flange of the piping element to compress the gasket into sealing engagement with each of the piping element and the pipe length, a force resulting from movement of the gland being transferred to an entire circumference of the gasket by a surface of the gripping ring and a surface of the bridge.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 1 is a perspective view of a gate valve comprising a mechanical joint in accordance with one aspect of the current disclosure.

FIG. 2 is a perspective view of a gate valve comprising a mechanical joint in accordance with another aspect of the current disclosure.

FIG. 20 is a side perspective view of a first end of the bridge of FIG. 15.

FIG. 21 is a side perspective view of a second end of the bridge of FIG. 15.

FIG. 22 is a bottom perspective view of a bottom end of the bridge of FIG. 15.

DETAILED DESCRIPTION

Figure 3:
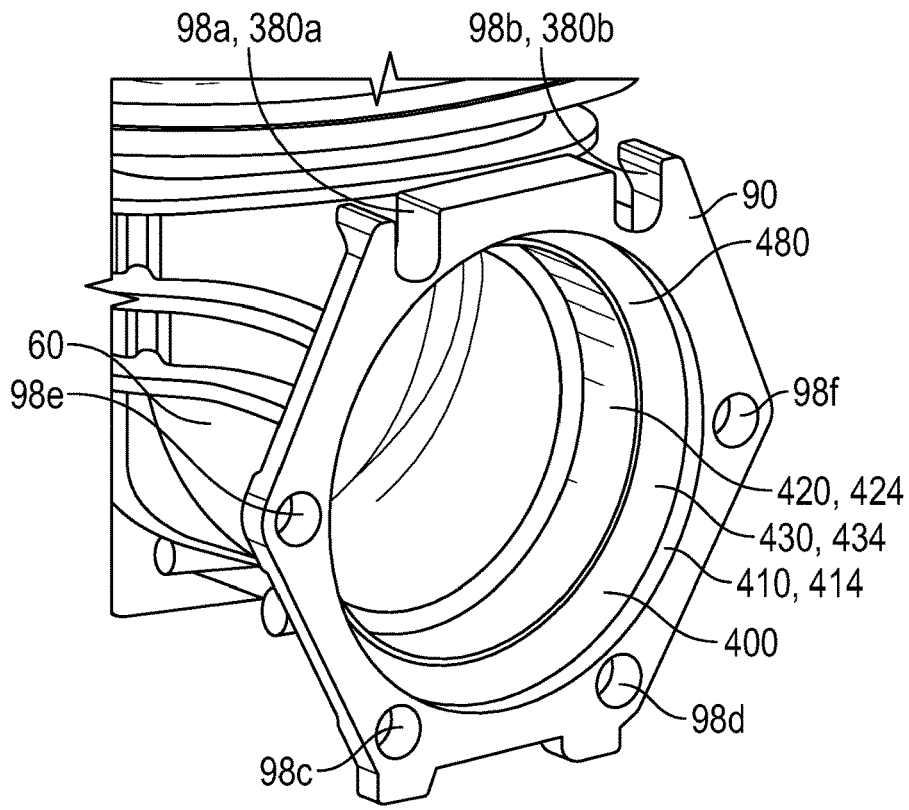
FIG. 3 is a perspective view of a flange of the gate valve of FIG. 1.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

In one aspect, a mechanical joint restraint and associated methods, systems, devices, and various apparatuses are disclosed herein. In one aspect, the mechanical joint restraint can comprise a gasket.

FIG. 1 is a perspective front view of portion of a pipe system 50 comprising a piping element 60 and a pipe length 70, each of which can define an axis 101. As shown, the pipe system 50 can further comprise a mechanical joint 80 in accordance with one aspect of the disclosure. In some aspects, as shown, the piping element 60 can be a gate valve. In other aspects, the piping element 60 can be another type of valve configured to open and close; a hydrant; a fitting such as a tee, an elbow, or a coupling; or another pipe length. The mechanical joint 80 can comprise a flange 90 of the piping element 60 and a mechanical joint restraint 100 for securing the pipe length 70 to the piping element 60. The mechanical joint restraint 100 can comprise a gasket 600 (shown in FIG. 5), a gripping ring 700 (shown in FIG. 5) and a gland 800, all of which will be described in more detail below. The mechanical joint restraint 100 can further comprise fasteners 190. As shown, the mechanical joint restraint 100 can comprise a quantity of six of the fasteners 190, one or more of which can comprise an anti-rotation feature such as, for example, found in T-bolts as discussed below. Each of the fasteners 190 can comprise a head 192 (shown in FIG. 2) and a shaft 194. Each of the fasteners 190 can further comprise a nut 196.

The pipe length 70 can define an inner surface 72 and an outer surface 73, a first end 75 (shown in FIG. 11) and a second end 76. As shown, each of the first end 75 and the second end 76 can define a plain end of the pipe length 70. A plain end of the pipe length 70 is an end of the pipe length 70 that has not been further formed beyond cutting to length and therefore in cross-section is substantially the same size and shape as a cross-section of the pipe length 70 at a distance from the first end 75 or the second end 76. A plain end of a typical pipe has the shape of a plain cylinder.

FIG. 2 is a perspective front view of a portion of the pipe system 50 comprising the piping element 60 and the pipe length 70. As shown, the pipe system 50 can further comprise a mechanical joint 80 in accordance with another aspect of the disclosure. In some aspects, as shown, the flange 90 of the piping element 60 and of the mechanical joint restraint 100 can be of a different configuration than shown in FIG. 1. Nonetheless, the mechanical joint restraint 100 can comprise the same elements as shown in FIG. 1—namely, the gasket 600, the gripping ring 700, and a gland 800—but arranged differently as desired. Again, the mechanical joint restraint 100 can further comprise the fasteners 190. As shown, the mechanical joint restraint 100 can comprise a quantity of four of the fasteners 190.

As shown in each of FIGS. 1 and 2, the mechanical joint restraint 100 can be common between multiple mechanical joints 80 such that the same mechanical joint restraint 100 can be used in a different configuration or orientation, including with a lesser or greater quantity of the fasteners 190 than that shown.

FIG. 3 shows a perspective view of the flange 90 of the mechanical joint 80 and of the piping element 60 shown in FIG. 1. The piping element 60—and the flange 90 in particular—can comprise a first entrance wall 410 defining a first entrance bore 414, a second entrance wall 420 defining a second entrance bore 424, and a connecting wall 430 extending from the first entrance wall 410 to the second entrance wall 420 and defining a connecting bore 434. The first entrance wall 410, the second entrance wall 420, and the connecting wall 430 can define a sealing cavity 480 around the outer surface 73 (shown in FIG. 1) of the pipe length 70 (shown in FIG. 1) for placement of at least the gasket 600. The flange 90 of the piping element 60 can define mounting openings 98a,b,c,d,e,f, which can be sized to receive the fasteners 190.

Figure 4:
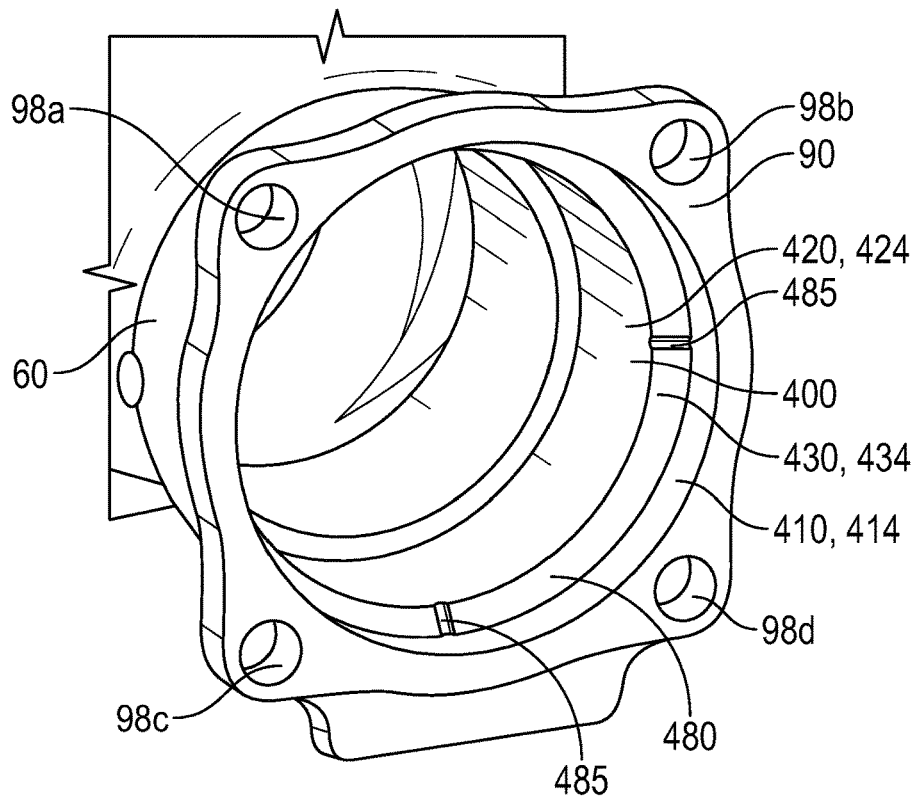
FIG. 4 is a perspective view of a flange of the gate valve of FIG. 2.

In some aspects, as shown in FIG. 3, some of the mounting openings 98 can be a slot. In other aspects, as shown in FIG. 4, all of the mounting openings 98 can be a hole. More specifically, as shown in FIG. 3, the mounting openings 98 can be anti-rotation notches such as, for example and without limitation, a pair of anti-rotation notches 380a,b. The number of anti-rotation notches 380 should not be considered limiting on the current disclosure, as in various other examples any desired number of anti-rotation notches 380, including zero anti-rotation notches 380, can be present. In some aspects, the anti-rotation notches 380a,b can be configured to prevent the fasteners 190 (shown in FIG. 1), which can be T-bolts (not shown as such) from rotating during pipe installation and, more specifically, the tightening of the fasteners 190, which were otherwise tend to cause rotation of the fasteners 190. The anti-rotation notches 380 can be configured to hold the head 192 of the fastener 190 in place while tightening of the fastener 190 such that the operator does not have to hold the head of the fastener 190 in place. A head of each of the T-bolts can have an elongated "T" shape that cannot rotate without contacting some portion of the anti-rotation notches 380 and thereby not require a separate tool to prevent their rotation during tightening of the mechanical joint 80.

FIG. 4 shows a perspective view of the flange 90 of the mechanical joint 80 and of the piping element 60 shown in FIG. 2. The piping element 60—and the flange 90 in particular—can comprise the first entrance wall 410 defining the first entrance bore 414, the second entrance wall 420 defining the second entrance bore 424, and the connecting wall 430 extending from the first entrance wall 410 to the second entrance wall 420 and defining the connecting bore 434. Again, the first entrance wall 410, the second entrance wall 420, and the connecting wall 430 can define the sealing cavity 480 around the outer surface 73 of the pipe length 70 (shown in FIG. 2) for placement of at least the gasket 600. As shown, however, the dimensions and orientations of each of the features and surfaces can vary between the piping element 60 shown in FIG. 1 and the piping element 60 shown in FIG. 2. As shown, the connecting wall 430 can be angled with respect to the first entrance wall 410 and the second entrance wall 420 and with respect to the axis 101.

The flange 90 of the piping element 60 can define mounting openings 98, which can be sized to receive the fasteners 190. In some aspects, as shown in FIG. 3, some of the mounting openings 98 can be a slot. In other aspects, as shown in FIG. 4, all of the mounting openings 98 can be a hole. Any one or more of the aforementioned features of the piping elements 60 exemplarily shown at least in FIGS. 3 and 4—including the flange 90 and the entrance walls 410,420—can define a female socket 400 into which the pipe length 70 can be received.

The mounting openings 98 can define a first pattern (defined by a physical arrangement of the holes) in the piping element 60 shown in FIG. 3, and the mounting openings 98 can define a second pattern in the piping element 60 shown in FIG. 4. As shown, the second pattern can be different from the first pattern.

The piping element 60 can optionally define an inflation channel or media channel 485 in the connecting wall 430. The media channel 485 can allow for movement of fluid in the pipe system from beyond the gasket 600 into a portion of the sealing cavity 480 axially outward from a portion of the gasket 600 so that a pressure of the fluid can provide additional sealing between the gasket 600 and the pipe length 70. As shown, the piping element 60 can define a plurality of media channels 485. The cross-sectional profile of each media channel 485 can be semi-circular, although other cross-sectional profiles are contemplated by this disclosure.

Figure 5:
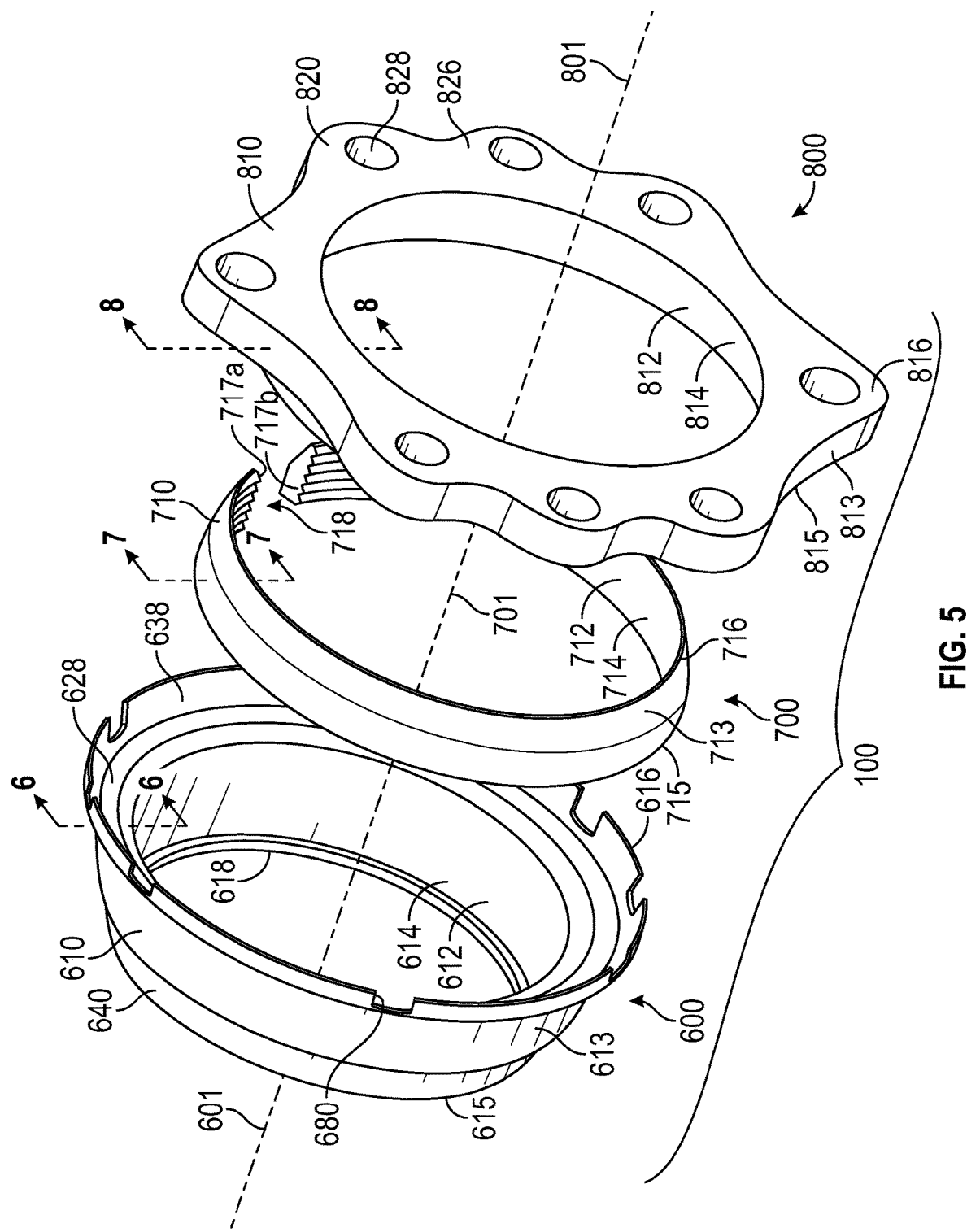
FIG. 5 is an exploded perspective view of a mechanical joint restraint of FIG. 1 and FIG. 2, the mechanical joint restraint comprising a gasket, a gripping ring, and a gland.

FIG. 5 is an exploded perspective view of the gasket 600, the gripping ring 700, and the gland 800 of the mechanical joint restraint 100. As shown, the gasket 600 can define an annular shape defining a gasket bore 614 extending through the gasket 600 from a first gasket end 615 of the gasket 600 to a second gasket end 616 of the gasket 600. The gasket bore 614 can define an axis 601 extending from the first gasket end 615 to the second gasket end 616. The gasket 600 can define a sealing band 610, which can form a main body of the gasket 600 for later sealing of one or more gaps between various parts of the mechanical joint restraint 100. The gasket can define an inner surface 612 defining the gasket bore 614 and extending from the first gasket end 615 to the second gasket end 616, an outer surface 613 extending from the first gasket end 615 to the second gasket end 616, a first end surface 625 (shown in FIG. 6) defined by the first gasket end 615, and a second end surface 626 (shown in FIG. 6) defined by the second gasket end 616.

The gasket 600 can define a stop lip 618 proximate to and, as also shown, defining the first gasket end 615 of the gasket 600, and the stop lip 618 can extend radially inward from other portions of the gasket 600 relative to the axis 601. The gasket 600 can define a stop lip 628 proximate to the second gasket end 616 of the gasket 600, and the stop lip 628 can extend radially outward from other portions of the gasket 600 relative to the axis 601. The gasket 600 can define a stop lip 638 proximate to and, as also shown, defining the second gasket end 616 of the gasket 600, and the stop lip 638 can extend axially outward from other portions of the gasket 600 relative to the first gasket end 615. As shown, the stop lip 638 can define one or more notches 680, which can be aligned with and provide clearance for the fasteners 190 when the mechanical joint restraint 100 is assembled. As shown, the gasket 600 can comprise a pipe collar 640, which can extend from the sealing band 610 to the stop lip 618.

The gripping ring 700 can define an annular shape with a ring bore 714 extending through the gripping ring 700 from a first ring end 715 of the gripping ring 700 to a second ring end 716 of the gripping ring 700. The ring bore 714 can define an axis 701 extending from the first ring end 715 to the second ring end 716. The gripping ring 700 can define a body 710 for transferring force acting through various parts of the mechanical joint restraint 100 into a surface of the pipe length 70 (shown in FIG. 1). As shown, the gripping ring 700 can define a split ring wherein two circumferential ends 717a,b of the gripping ring 700 define a gap 718 therebetween. The gap 718 can allow for a compression of the gripping ring 700 against the pipe length 70 and resulting reduction in a diameter of the gripping ring 700. The gripping ring 700 can define an inner surface 712 defining the gripping ring bore 714 and extending from the first ring end 715 to the second ring end 716, an outer surface 713 extending from the first ring end 715 to the second ring end 716, a first end surface 725 (shown in FIG. 7) defined by the first ring end 715, and a second end surface 726 (shown in FIG. 7) defined by the second ring end 716.

The gland 800 can define an annular shape with a gland bore 814 extending through the gland 800 from a first gland end 815 of the gland 800 to a second gland end 816 of the gland 800. The gland bore 814 can define an axis 801 extending from the first gland end 815 to the second gland end 816. The gland 800 can define a body 810 for transferring force acting through various parts of the mechanical joint restraint 100 into a surface of the pipe length 70 (shown in FIG. 1). A vertical flange portion 820 of the gland 800 can define a plurality of fastener holes 828, which can extend through the vertical flange portion 820 as shown and will be further described below. The gland 800 can define an inner surface 812 defining the gland bore 814 and extending from the first gland end 815 to the second gland end 816, an outer surface 813 extending from the first gland end 815 to the second gland end 816, a first end surface 825 (shown in FIG. 8) defined by the first gland end 815, and a second end surface 826 defined by the second gland end 816.

The fastener holes 828 of the gland 800 can be configured to align with the aforementioned first pattern or the aforementioned second pattern or another pattern defined by the plurality of mounting openings 98 defined in the piping element 60. The gland 800 can thus be interchangeably used with multiple piping elements 60 by aligning the plurality of fastener holes 828 of the gland 800 with the corresponding or matching plurality of mounting openings 98 of the piping element 60.

Figure 6:
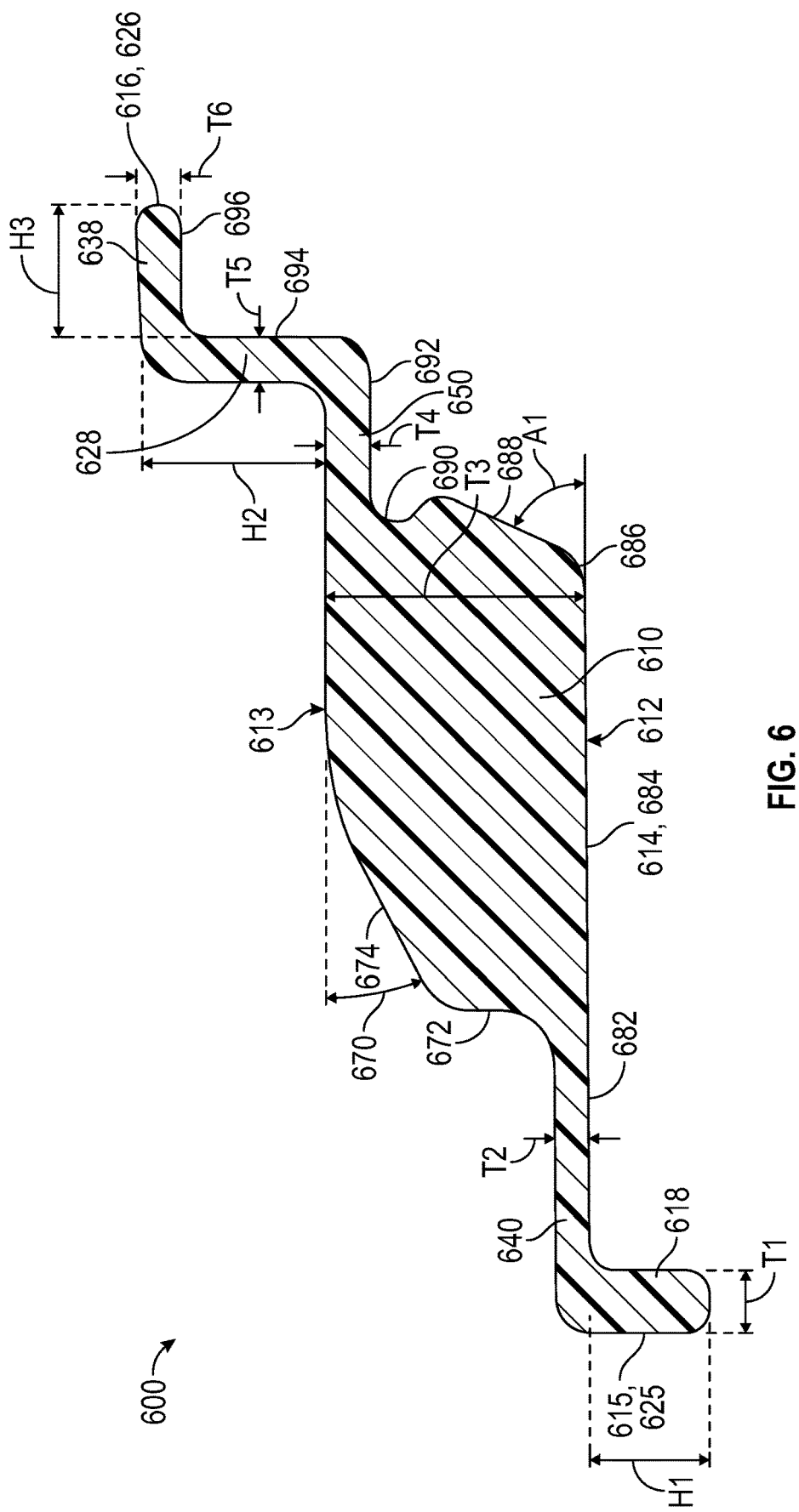
FIG. 6 is a sectional view of the gasket of FIG. 5 taken along line 6-6 of FIG. 5.

FIG. 6 is a sectional view of the gasket 600. As shown, the gasket 600 can comprise the sealing band 610, the stop lips 618,628,638, the pipe collar 640, and a ring collar 650. As shown, the ring collar 650 can extend in an axial direction from the sealing band 610 towards the second gasket end 616. The sealing band 610 can be positioned between the pipe collar 640 and the ring collar 650. As shown, the stop lip 618 can define a stop lip thickness T1, the pipe collar 640 can define a pipe collar thickness T2, the sealing band 610 can define a sealing band thickness T3, the ring collar 650 can define a ring collar thickness T4; the stop lip 628 can define a stop lip thickness T5, and the stop lip 638 can define a stop lip thickness T6. Each of the thicknesses T2,T4,T4,T6 can be measured in a radial direction relative to the axes 101,601 (601 shown in FIGS. 5 and 101 shown in FIG. 11). Each of the thicknesses T1,T5 can be measured in an axial direction relative to the axes 101,601. In some aspects, as shown, the sealing band thickness T3 can be greater than the ring collar thickness T4 and the pipe collar thickness T2. In some aspects, as shown, the ring collar thickness T4 can also be greater than the pipe collar thickness T2. In other aspects, the pipe collar thickness T2 can be greater than the ring collar thickness T4.

For example and without limitation, the thickness T1 can be defined by a desired clearance in an axial direction relative to the axes 101,601 between the pipe length 70 and the socket 400 proximate to the first stop lip 618; the thickness T2 can be defined by a desired clearance in a radial direction relative to the axes 101,601 between the pipe length 70 and the socket 400 proximate to the pipe collar 640; the thickness T3 can be defined by a desired clearance in the radial direction between the pipe length 70 and the socket 400 proximate to the sealing band 610; the thickness T4 can be defined by a desired clearance between the gripping ring 700 and the socket 400, at least when the mechanical joint restraint 100 is in an untightened condition; the thickness T5 can be defined by a desired clearance in the axial direction between the gland 800 and the socket 400; and the thickness T6 can be set to restrict movement in the radial direction of the gland 800 with respect to the gasket 600. In some aspects, the thicknesses T1—T6 of the gasket 600 can be made to match each other. In other aspects, one or more of the thicknesses T1—T6 of the gasket 600 can each measure a different value from the other thicknesses T1—T6.

The stop lip 618 can define a stop lip height H1 measured from the inner surface 612 of the gasket bore 614 facing radially inward with respect to the axis 601 of the gasket 600. The stop lip 628 can define a stop lip height H2 measured from the outer surface 613 at the ring collar 650 of the gasket 600 facing radially outward with respect to the axis 601 of the gasket 600. The stop lip 638 can define a stop lip height H3 measured from a stop lip bore portion 694 of the stop lip 628 facing axially outward with respect to the axis 601 of the gasket 600. Each of the first gasket end 615 and the second gasket end 616 of the gasket 600 can be vertical in cross-section and can be in facing contact with any mating part.

The outer surface 613 of the gasket 600—and in particular the sealing band 610—can define a shoulder 672 and a chamfered edge 674, which can be angled at an angle 670 with respect to a neighboring portion of the outer surface 613 and with respect to the ring collar 650. The inner surface 612 of the gasket 600—and in particular the sealing band 610—can define a sealing band bore portion 684 of the gasket bore 614 between a pipe collar bore portion 682 and a transition edge 686, which can also be defined by the sealing band 610. In some aspects, the transition edge 686 can define a radius in cross-section. In other aspects, the transition edge 686 can be a chamfer. In some aspects, as shown, the sealing band bore portion 684 and the pipe collar bore portion 682 can together be substantially cylindrical. In other aspects, the pipe collar bore portion 682 or both the pipe collar bore portion 682 and the sealing band bore portion 684 can taper towards either the first gasket end 615 or the second gasket end 616.

A ring groove 690 can be defined within the gasket bore 614 between the sealing band 610 and the ring collar 650. The ring groove 690 can be configured to receive the first ring end 715 (shown in FIG. 7) of the gripping ring 700 (shown in FIG. 7). The ring groove 690 can be a relieved area for the first ring end 715 of the gripping ring 700 such that the gripping ring 700 can compress the gasket 600 without immediately bottoming out in the ring groove 690. The sealing band 610 can define an angled surface 688 between the transition edge 686 and a ring collar bore portion 692 defined between the angled surface 688 or the ring groove 690 and a stop lip bore portion 694. The gasket 600 can define a stop lip bore portion 696 of the gasket bore 614 between the stop lip bore portion 694 and the second gasket end 616. A groove angle A1 can be defined between the sealing band bore portion 684 of the sealing band 610 and the angled surface 688 of the sealing band 610.

In some aspects, as shown, the groove angle A1 can be an acute angle. As the transition edge 686 extends from the sealing band bore portion 684 to the angled surface 688, the transition edge 686 can extend radially outward from the sealing band bore portion 684 and axially outward towards the second gasket end 616, in each case relative to the axis 101. As the angled surface 688 extends from the ring groove 690 or a ring collar bore portion 692 to the transition edge 686, the angled surface 688 can extend radially inward toward the transition edge 686 and axially inward towards the first gasket end 615 relative to the axis 101.

Figure 7:
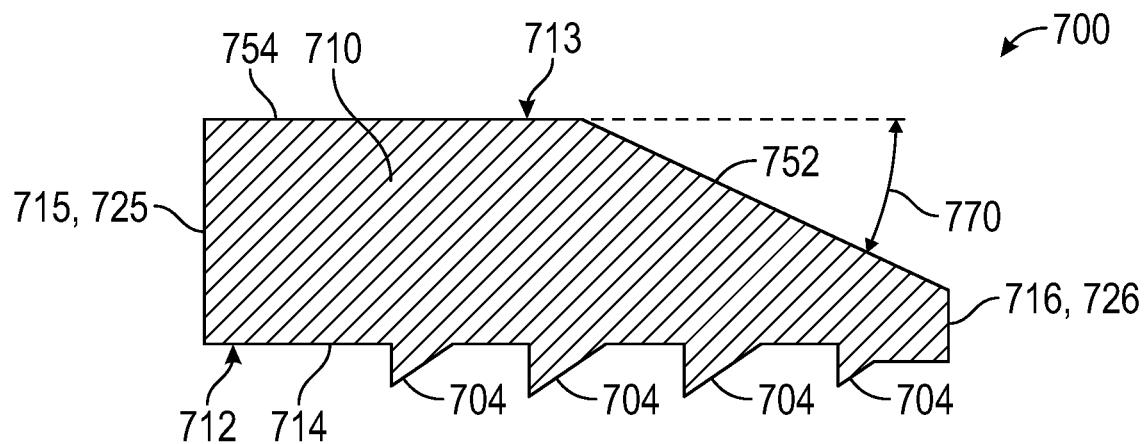
FIG. 7 is a sectional view of the gripping ring of FIG. 5 taken along line 7-7 of FIG. 5.

FIG. 7 is a sectional view of the gripping ring 700. A radial inner surface of the gripping ring 700 further may include a plurality of gripping members 704 extending radially inwardly. Each of the plurality of gripping members 704 can be configured to engage the outer surface 73 of the pipe length 70 upon radial compression of the gripping ring 700. In some aspects, as shown, the gripping members 704 are teeth, although other types of gripping members are contemplated within the scope of this disclosure. In some aspects, as shown, each of the teeth define a triangular shape in cross-section. In other aspects, the teeth can have another shape. As shown, the outer surface 713 of the gripping ring 700 can comprise a first portion 752 and a second portion 754. As shown, a first portion 752 can be tapered or sloped with respect to the second portion 754 and with respect to the axis 601 of the gasket 600 by an angle 770. As shown, the second portion 754 can be aligned in cross section with or parallel to the axis 601 of the gasket 600. Each of the first ring end 715 and the second ring end 716 of the gripping ring 700 can be vertical in cross-section and can be in facing contact with any mating part.

Figure 8:
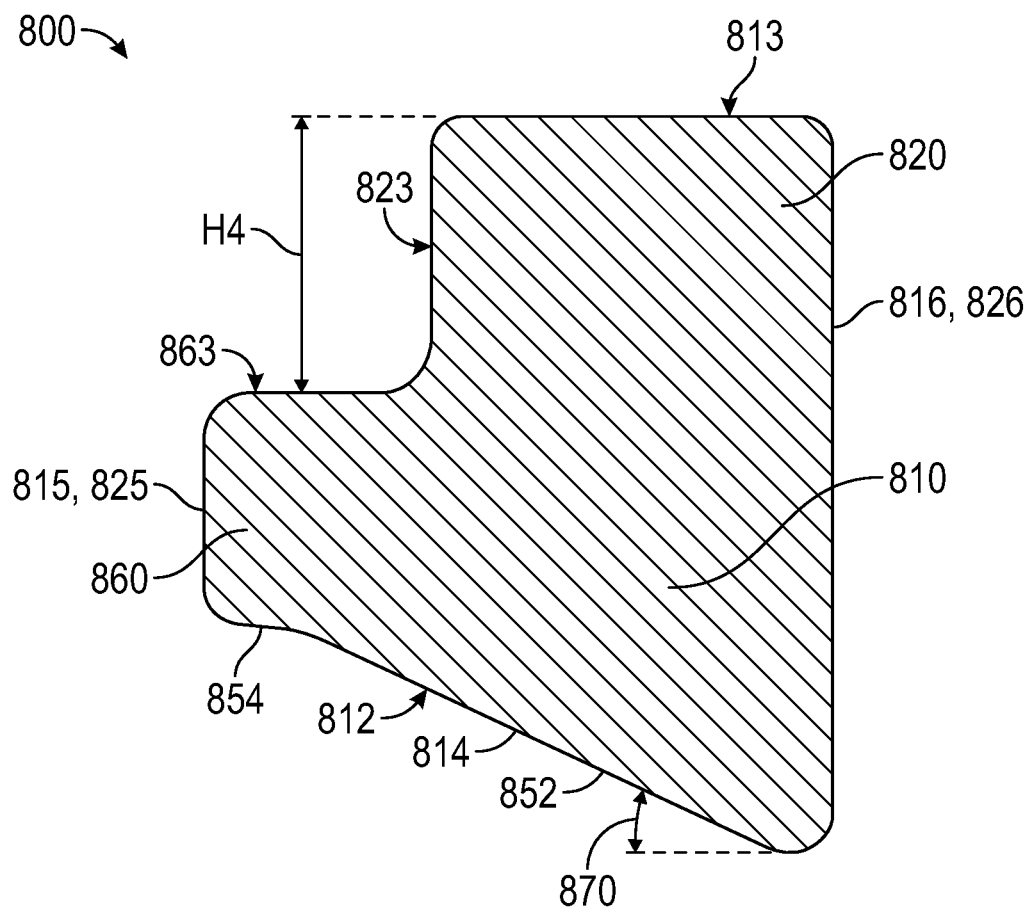
FIG. 8 is a sectional view of the gland of FIG. 5 taken along line 8-8 of FIG. 5.

FIG. 8 is a sectional view of the gland 800. As shown, the gland bore 814 of the gland 800 can comprise a first portion 852. The first portion 852 can be tapered or sloped with respect to the second portion 854 and with respect to the axis 601 of the gasket 600 by an angle 870. The second portion 854 can be aligned in cross section with or parallel to the axis 601 of the gasket 600. The vertical flange portion 820 can define a flange height H4, which can vary based on the angular position on the flange 90 with respect to a reference angular position on the vertical flange portion 820. The gland 800 can further comprise a horizontal flange portion 860, which can define the second portion 854, the first gland end 815, and a radially outer flange surface 863. Meanwhile, the vertical flange portion 820 can define an axially inner flange surface 823. Each of the radially outer flange surface 863 and the axially inner flange surface 823 can be part of and be at least partially defined by the outer surface 813. Each of the first gland end 815 and the second gland end 816 of the gland 800 can be vertical in cross-section and can be in facing contact with any mating part.

Figure 9:
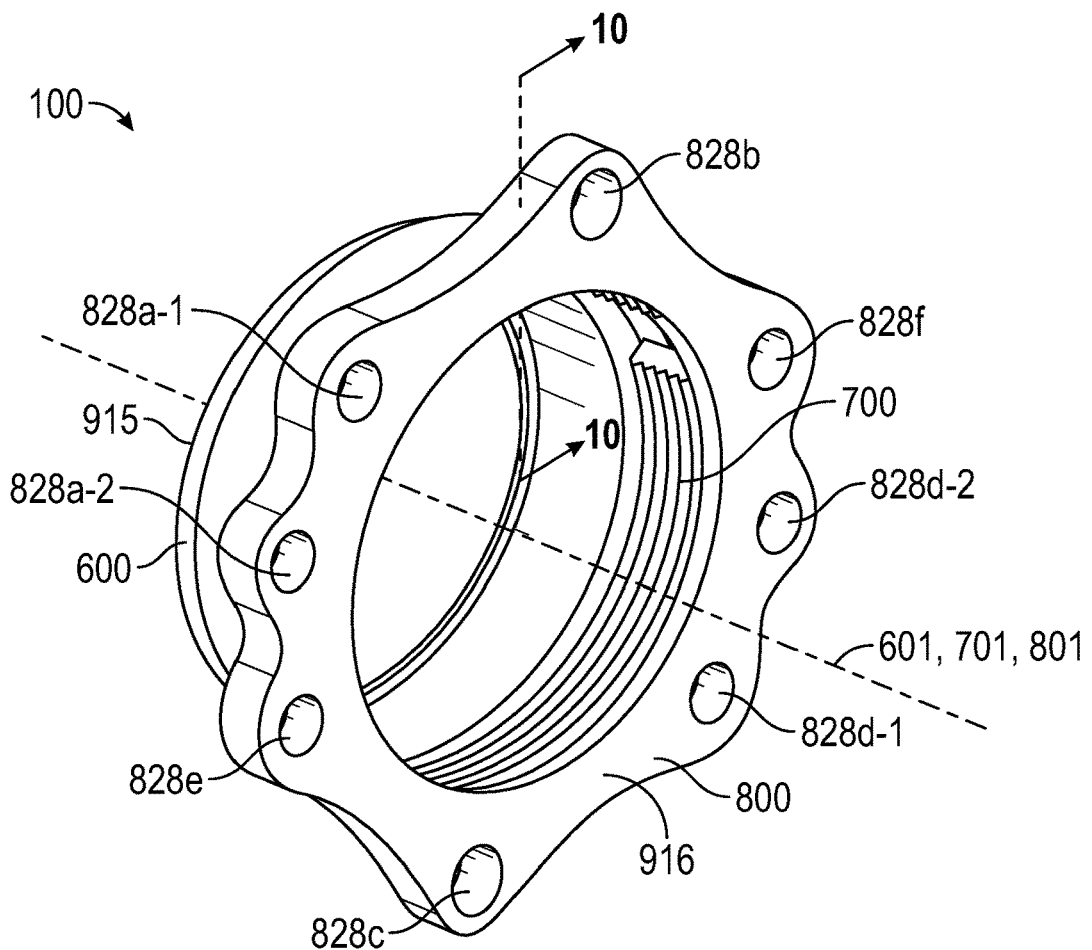
FIG. 9 is an assembled perspective view of the mechanical joint restraint of FIG. 5.

FIG. 9 is an assembled perspective view of the mechanical joint restraint 100 without the fasteners 190. As shown, each of the gasket 600, the gripping ring 700, and the gland 800 can be aligned along the respective axes 601,701,801 and can together define a first end 915 and a second end 916 (again, without considering the fasteners 190). When the mechanical joint restraint 100 is used with a pipe element such as the piping element 60 shown in FIG. 1, six of the fastener holes 828a-1,b,c,d-1,e, f can be used to secure the gland 800 to the corresponding mounting openings 98a,b, c,d,e,f of the flange 90 of the pipe element 60. When the mechanical joint restraint 100 is used with a different pipe element such as the piping element 60 shown in FIG. 2, a greater or lesser number of the fastener holes 828—for example and without limitation, four of the fastener holes 828 and specifically 828a-2,b,c,d-2—can be used to secure the gland 800 to the corresponding mounting openings 98a,b,c,d of the flange 90 of the pipe element 60.

Figure 10:
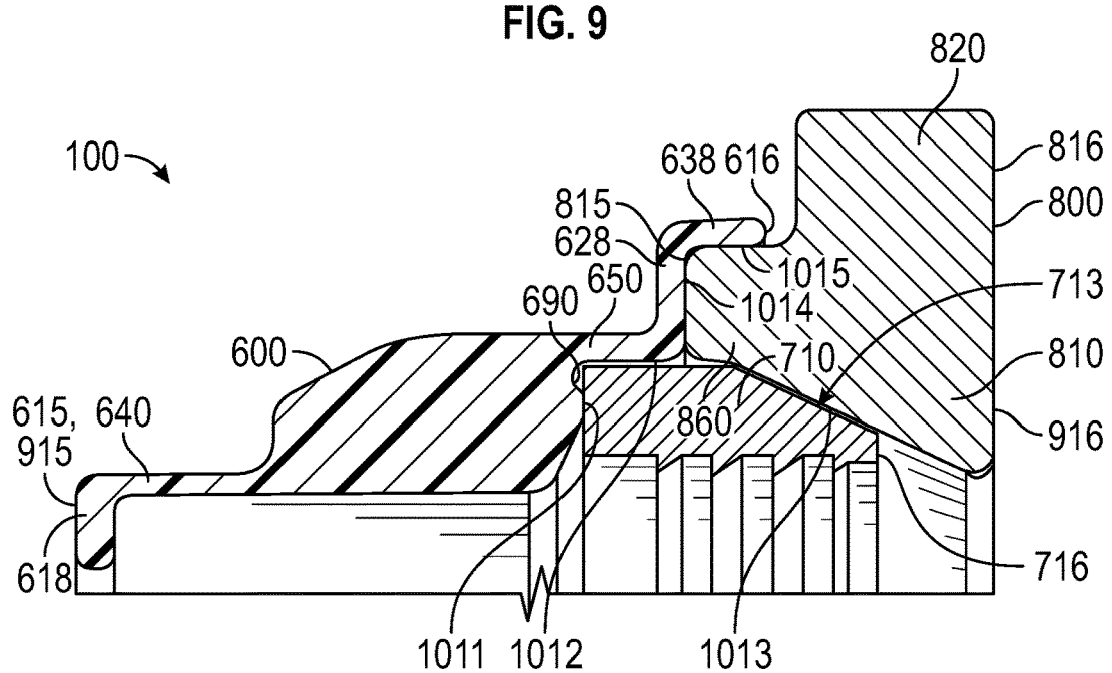
FIG. 10 is a sectional view of the mechanical joint restraint of FIG. 5 taken along line 10-10 of FIG. 9.

FIG. 10 is a sectional view of the mechanical joint restraint 100. As shown, the sealing band 610, the ring collar 650, and the ring collar bore portion 692 (shown in FIG. 6) of the gasket 600 can be sized to receive a portion of the gripping ring 700 such as, for example and without limitation, that portion of the body 710 of the gripping ring 700 defined by the first ring end 715—and the first end surface 725 (shown in FIG. 7)—and the outer surface 713. The stop lip 628 and the stop lip bore portion 694 (shown in FIG. 6) as well as the stop lip 638 and the stop lip bore portion 696 (shown in FIG. 6) can be sized to receive a portion of the gland 800 such as, for example and without limitation, that portion of the horizontal flange portion 860 defined by the first gland end 815 and the first end surface 825. The first portion 852 (shown in FIG. 8) and the second portion 854 (shown in FIG. 8) of the gland 800 can be sized to receive portions of the gripping ring 700 such as, for example and without limitation, the first portion 752 and the second portion 754.

Each of the mating surfaces of the piping element 60, the gasket 600, the gripping ring 700, and the gland 800 can define similar angles in cross-section. For example and without limitation, the angle 770 of the gripping ring 700 can be equal to the angle 870 of the gland 800, the angle 670 (shown in FIG. 6) of the gasket 600 can be equal to an angle defined in axial cross-section by the connecting wall 430 (shown in FIG. 11) of the piping element 60 (shown in FIG. 11), and so forth. Each of the gasket 600, the gripping ring 700, and the gland 800 can mate with each other and with the piping element 60 and the pipe length 70 through the use of complementary surfaces with similar if not identical angles. Further, each of the gasket 600, the gripping ring 700, and the gland 800 can nest within each other as shown, with each of the stop lip 618, the sealing band 610, the ring collar 650, the stop lip 628, and the stop lip 638 of the gasket 600 providing a stop surface or stop against which a mating part such as the piping element 60 or the pipe length 70 can contact. In fact, assembly of parts of the mechanical joint restraint 100 in a reverse order such as by orienting the gripping ring 700 in a reverse orientation direction axially opposite to that shown—with the second ring end 716 of the gripping ring 700 proximate to the first end 915—can be made practically impossible by shortening the fasteners 190 (shown in FIG. 11) or threaded portions thereof, or by sizing the parts with respect to the pipe length 70 to only engage or otherwise assemble with each other and with the piping element 60 and the pipe length 70 when the mechanical joint restraint 100 itself is properly assembled.

In some aspects, any one of an interface 1011 or an interface 1012 between the gasket 600 and the gripping ring 700, an interface 1013 between the gripping ring 700 and the gland 800, and an interface 1014 or an interface 1015 between the gasket 600 and the gland 800 can be joined with an adhesive such as, for example and without limitation, a cyanoacrylate adhesive (such as sold under, for example and without limitation, the LOCTITE brand by Henkel Corporation of Dusseldorf, Germany). By joining the parts to each other with adhesive, the mechanical joint restraint can be assembled to and slid over the pipe length 70 as an assembly without a technician even needing to know how each of the individual parts fit together.

The second gasket end 616 of the gasket 600 can be positioned in facing engagement with the horizontal flange portion 860 of the gland 800. The gasket 600 can comprise an elastic and resilient material, such as, for example and without limitation, an elastomer, polymer, or rubber. In some aspects, as shown, the gasket 600 can be stretched over the horizontal flange portion 860 of the gland 800 such that the gasket 600 can be retained on the gland 800. In other aspects, the gasket 600 may not or need not stretch over the gland 800, and the gasket 600 can fit over the gland 800 in a relaxed state. In some aspects, the gasket 600 can be secured on the gripping ring 700 or the gland 800 such as with, for example and without limitation, glue, adhesive, mastic, epoxy, tape, or other fastening mechanism, such as a mechanical fastener. With the gasket 600 retained on the gripping ring 700 and the gland 800, the mechanical joint restraint 100 can be handled as a single unit which can aid in the assembly of a mechanical joint as further described below. In some aspects, the gasket 600 may not be secured to the gripping ring 700 or the gland 800. In some aspects, the gasket 600 may not comprise the pipe collar 640 or the ring collar 650. In some aspects, the gasket 600 may not define one or more of the stop lips 618,628,638.

Figure 11:
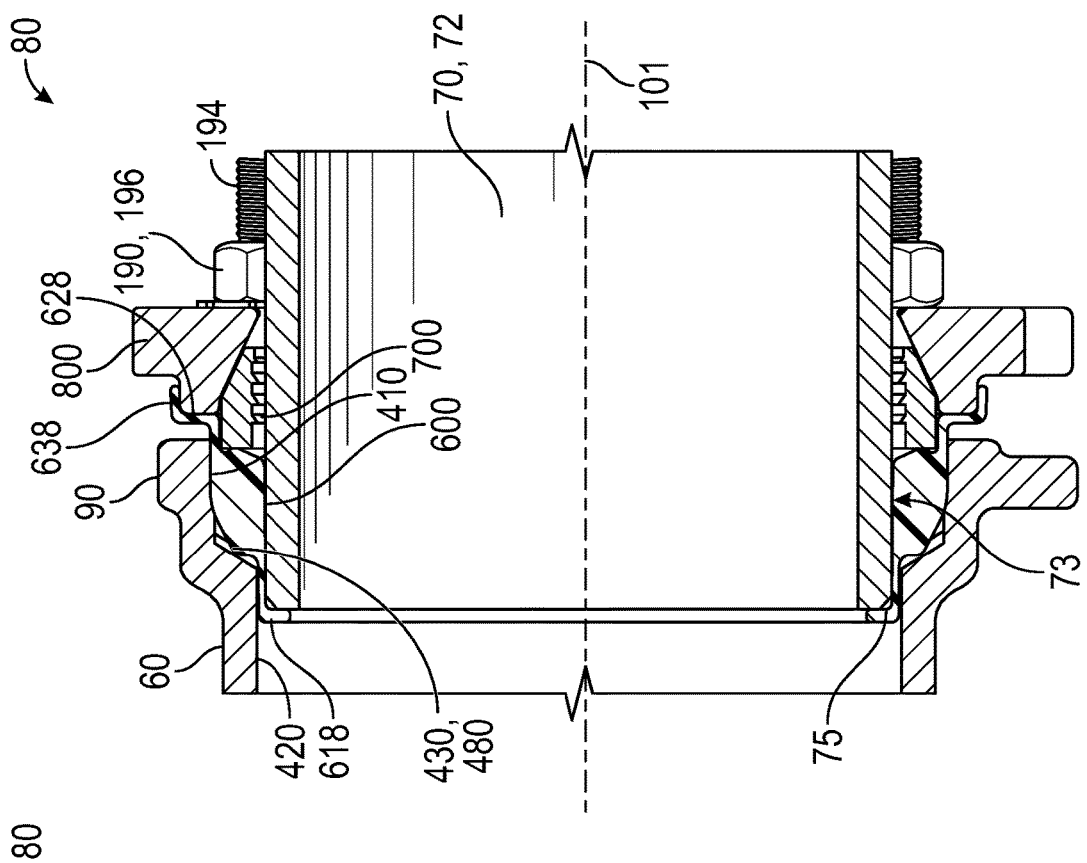
FIG. 11 is a sectional view of the mechanical joint of FIG. 1 taken along line 11-11 of FIG. 1.
Figure 12:
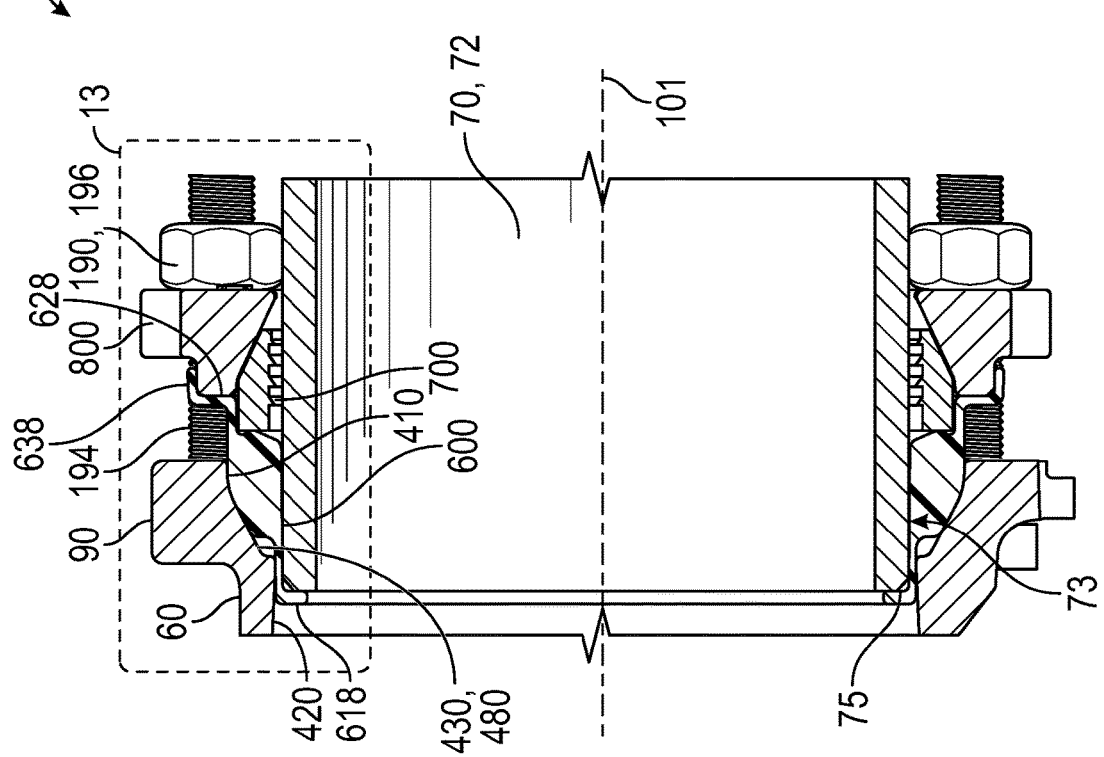
FIG. 12 is a sectional view of the mechanical joint of FIG. 2 taken along line 12-12 of FIG. 2.

FIGS. 11 and 12 are, respectively, sectional views of the mechanical joints 80 of FIGS. 1 and 2 but in an untightened condition wherein the gasket can be largely or completely uncompressed and the gripping ring 700 can remain disengaged from the pipe length 70 in its natural state and defining the gap 718 (shown in FIG. 5). As shown, the first end 75 of the pipe length 70 can be captured by the stop lip 618 at the first end 915 of the mechanical joint restraint 100 such that further movement of the pipe length 70 into the piping element 60 is restricted. This is because an inner diameter of the gasket 600 at the stop lip 618 can be less than an outer diameter of the pipe length 70. The first gland end 815 (shown in FIG. 8) of the gland 800 can be captured by the stop lips 628,638 proximate to the second gasket end 616 of the gasket 600 such that further movement of the gland 800 with respect to the gasket 600 and other surrounding parts is restricted.

In some aspects, as shown in FIG. 11, the mechanical joint 80 can comprise the socket 400 of the pipe element 60, the gasket 600, the gripping ring 700, the gland 800, and the pipe length 70. The piping element 60 commonly defines the socket 400, which can be configured to receive either of the ends 75,76 of the pipe length 70 as well as the gasket 600.

In other aspects, as shown in FIG. 12, the mechanical joint 80 can include a portion of one or products identified with the AQUAGRIP mark including the flange 90 of the pipe element 60. The piping element 60 and the flange 90 can be similar to that sold under the AQUAGRIP brand sold by Anvil International. As shown, the mechanical joint 80 can incorporate the same mechanical joint restraint 100 even though the flange 90 as shown varies in size and shape in comparison to the flange 90 of the mechanical joint 80 shown in FIG. 1.

Figure 13:
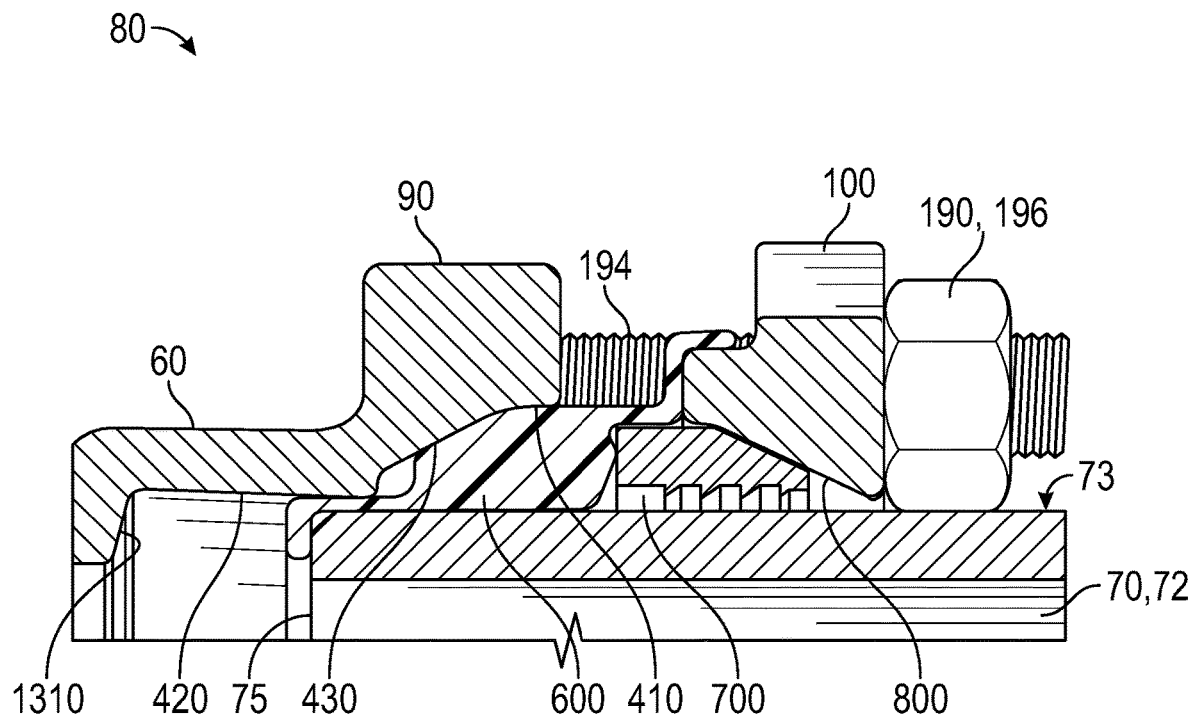
FIG. 13 is a detail view of the mechanical joint of FIG. 1 in an assembled but untightened condition taken from detail 13 of FIG. 11.
Figure 14:
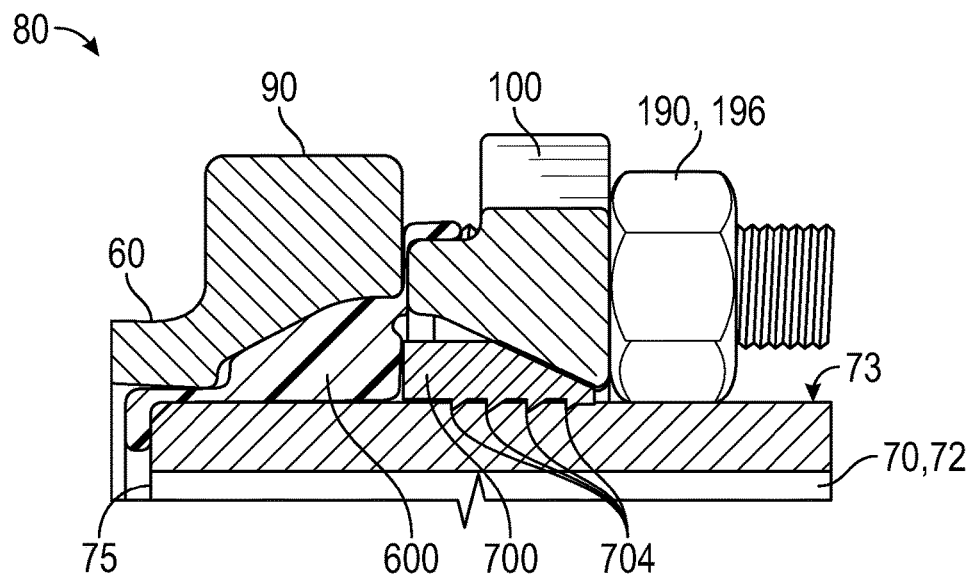
FIG. 14 is a detail view of the mechanical joint of FIG. 1 in an assembled and tightened condition similar to that taken from detail 13 of FIG. 11.

FIG. 13 is a detail view of the mechanical joint 80 shown in FIG. 1 in an assembled but untightened condition, while FIG. 14 is a detail view of the mechanical joint 80 of FIG. 1 in an assembled and tightened condition. As shown, the mechanical joint restraint 100 can be slipped over the first end 75 of the pipe length 70.

In some aspects, after the mechanical joint restraint 100 is slipped over the end 75 of the pipe length 70, both the mechanical joint restraint 100 and the pipe length 70 can together be inserted into the socket 400 of the piping element 60. The fasteners 190 can then be tightened to pull the gland 800 towards the flange 90 of the piping element 60, thereby compressing the gasket 600 and the gripping ring 700 in a radial direction towards the pipe length 70. The gasket 600 can be compressed into sealing engagement with the socket 400 and the outer surface 73 of the pipe length 70, and the gripping ring 700 can be stopped by the gasket 600, causing the gripping ring 700 to slide along the inner surface 812 of the gland 800, thereby radially compressing the gripping ring 700 by closing the gap 718 of the split ring and reducing an inner diameter of the ring bore 714 so that the gripping members 704 engage the outer surface 73 of the pipe length 70.

In other aspects, the mechanical joint restraint 100 can be inserted into the socket 400 of the piping element 60, and then the end 75 of the pipe length 70 can be inserted into both the mechanical joint restraint 100 and also into the socket 400 of the piping element 60 until the end 75 of the pipe length 70 contacts the stop lip 618 of the gasket 600. As described above, the fasteners 190 can then be tightened to pull the gland 800 towards the flange 90 of the piping element 60, thereby compressing the gasket 600 and the gripping ring 700 in a radial direction towards the pipe length 70.

In yet other aspects, either the gasket 600 or both the gasket 600 and the gripping ring 700 can first be inserted into the socket 400 of the piping element 60. Then either the gland 800 or both the gripping ring 700 and the gland 800 can be slipped over the end 75 of the pipe length 70. Then the end 75 of the pipe length 70—with either or both of the gripping ring 700 and the gland 800 already installed—can be inserted into either or both of the gasket 600 and the gripping ring 700 and also into the socket 400 of the piping element 60. As described above, the fasteners 190 can then be tightened to pull the gland 800 towards the flange 90 of the piping element 60, thereby compressing the gasket 600 and the gripping ring 700 in a radial direction towards the pipe length 70.

The mechanical joint 80 can be popular because it can work with a plain end of the pipe length 70 as shown and therefore does not require, for example, the pipe length 70 to be formed with a grooved connection or a flanged connection, which must generally be formed with special tooling. Being able to use the plain end as-is allows for the pipe length 70 to be cut to size in a field installation without the time and field equipment necessary to weld a flange to the plain end or to cut or roll a new groove in the plain end. As disclosed herein, the mechanical joint 80 can be assembled quickly with common hand tools such as a wrench or ratchet.

In some aspects, a method of using the mechanical joint restraint 100 can comprise tightening each of the fasteners 190 to a specified torque such as in the range of, for example and without limitation, 65-90 foot-pounds (approximately 88-122 Newton-meters). The method can comprise compressing the gasket 600 in both axial and radial directions relative to the axes 101,601. The method can comprise sealing between the mechanical joint restraint 100 and the pipe length 70 with engagement of the gripping ring 700. The method can comprise bottoming out the gland 800 against the flange 90—with only the second stop lip 628 where present in between the gland 800 and the flange 90—to indicate, at least by feel from an increase in torque required to further tighten the fasteners 190, full and proper engagement of the mechanical joint restraint 100 with the piping element 60 and the pipe length 70.

When tightening the fasteners 190 and specifically the nuts 196, the gripping ring 700 can grab the pipe length 70 and start to move it axially towards the pipe element 60. The stop lip 618 of the gasket 600 can set a preferred or desired gap between the first end 75 of the pipe length 70 and a pipe landing 1310 of the piping element 60 for ideal gasket compression and sealing. The stop lip 618 can allow for correct assembly and eliminate any need to measure and mark the pipe length 70 before assembly.

In some aspects, the method can comprise inserting the end of the pipe length 70 into the gland bore 814 of the gland after the gasket 600 and the gland 800 have been joined with adhesive. The method can comprise seating the first end 75 of the pipe length 70 against the stop lip 618 of the gasket 600. The method can comprise aligning the plurality of fastener holes 828 of the gland 800 with the plurality of mounting openings 98 of the piping element 60.

A method of manufacturing the mechanical joint restraint 100 can comprise forming the gasket 600; forming the gripping ring 700; forming the gland 800; aligning the axis 701 of the gripping ring 700 and the axis 801 of the gland 800 collinearly with the axis 601 of the gasket 600; positioning the gripping ring 700 radially inward from the ring collar 650 of the gasket 600 and the gland bore 814 of the gland 800 and radially outward from the sealing band 610 of the gasket 600 with respect to the first gasket end 615; positioning the gland 800 axially outward from the stop lip 628 of the gasket 600 with respect to the first gasket end 615 with the mechanical joint restraint 100 in an assembled condition; and joining the gripping ring 700 and the gland 800 to the gasket 600 with an adhesive. In some aspects the gripping ring 700 need not be present and the gasket 600 alone can seal between the piping element 60 and the pipe length 70 and secure the pipe length 70 with respect to the piping element 60.

In some aspects, using a single variation of the mechanical joint restraint 100 disclosed herein, the pipe length 70 can be formed from standard industry materials including, for example and without limitation, ductile iron and polyvinylchloride (PVC). In such aspects, part inventory requirements can be reduced in a factory, in warehousing and sales operations, and in field servicing operations. In other aspects, different variations of the mechanical joint restraint 100 can be prepared for optimization of particular user applications. In any case, the mechanical joint restraint 100 can make for a simplified, efficient, and reliable mechanical joint 80; can use the gripping ring 700, which does not "point" stress plastic pipes; and can operate with a minimal number of components. Furthermore, a seal created between the pipe length 70 and the piping element 60 need not be susceptible to the effect of corrosion and need not require special assembly procedures and specialized training or skill based on the various aspects disclosed herein.

Figure 15:
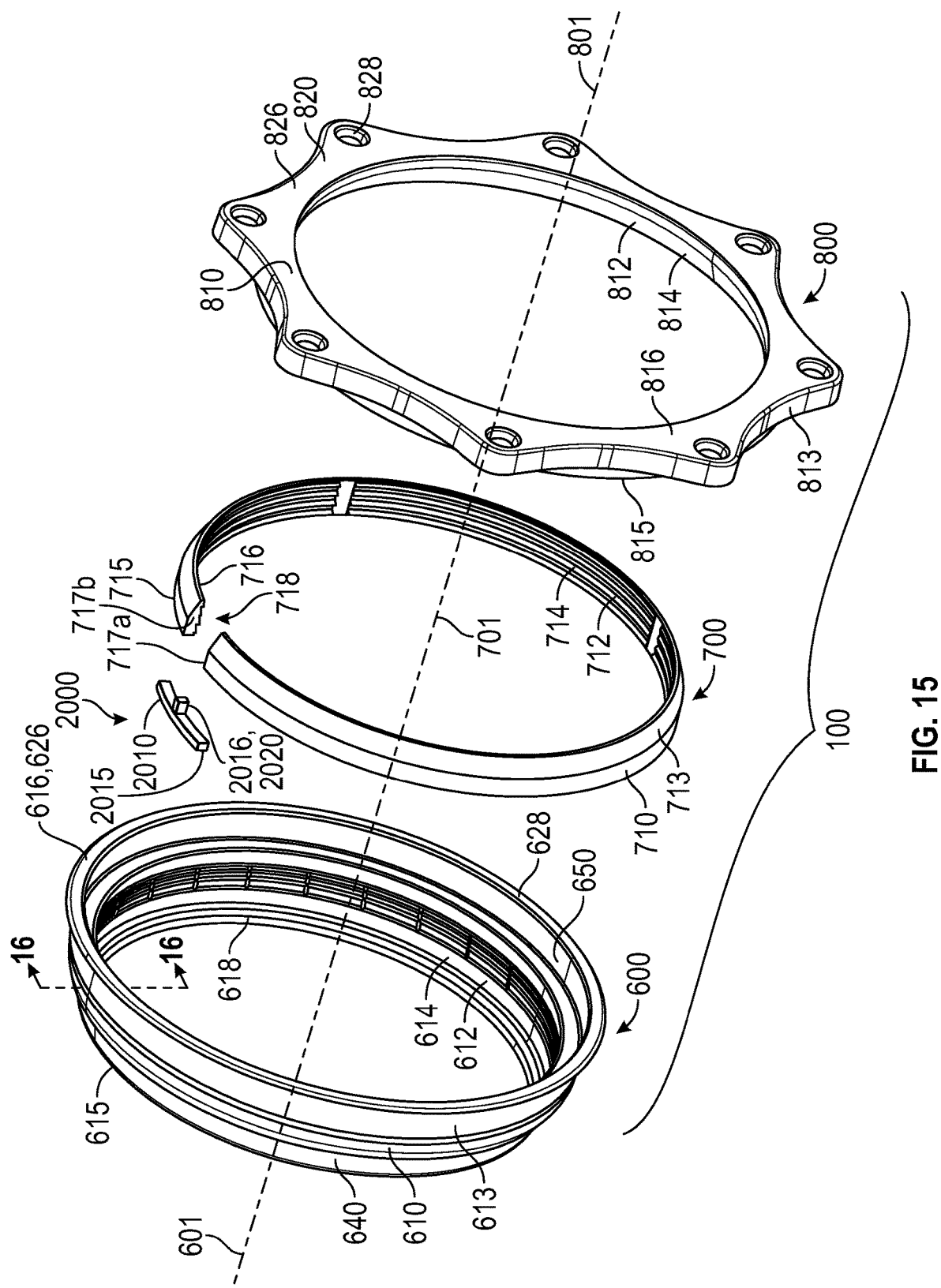
FIG. 15 is an exploded perspective view of a mechanical joint restraint in accordance with another aspect of the current disclosure, the mechanical joint restraint comprising a gasket, a bridge, a gripping ring, and a gland.

FIG. 15 is a perspective view of the mechanical joint restraint 100 in accordance with another aspect of the current disclosure. As shown, the mechanical joint restraint 100 can comprise the gasket 600, a bridge 2000, the gripping ring 700, and the gland 800.

As shown, the gasket 600 can define the gasket bore 614 extending through the gasket 600 from the first gasket end 615 of the gasket 600 to the second gasket end 616 of the gasket 600. The gasket bore 614 can define the axis 601 extending from the first gasket end 615 to the second gasket end 616. The gasket 600 can define the sealing band 610. The gasket can define the inner surface 612 defining the gasket bore 614 and extending from the first gasket end 615 to the second gasket end 616, an outer surface 613 extending from the first gasket end 615 to the second gasket end 616, the first end surface 625 (shown in FIG. 16) defined by the first gasket end 615, and the second end surface 626 defined by the second gasket end 616.

The gasket 600 can define the stop lip 618 proximate to and, as also shown, defining the first gasket end 615 of the gasket 600. The stop lip 618 can extend radially inward from other portions of the gasket 600 relative to the axis 601. The gasket 600 can define a stop lip 628 proximate to the second gasket end 616 of the gasket 600, and the stop lip 628 can extend radially outward from other portions of the gasket 600 relative to the axis 601 and, as also shown, can define the second gasket end 616 of the gasket 600. The gasket 600 can comprise the pipe collar 640, which can extend from the sealing band 610 to the stop lip 618. The gasket 600 can comprise the ring collar 650, which can extend from the sealing band 610 to the stop lip 628.

The gripping ring 700 can define the ring bore 714 extending through the gripping ring 700 from the first ring end 715 of the gripping ring 700 to the second ring end 716 of the gripping ring 700. The ring bore 714 can define the axis 701 extending from the first ring end 715 to the second ring end 716. The gripping ring 700 can define the body 710. As shown, the gripping ring 700 can define a split ring wherein two circumferential ends 717a,b of the gripping ring 700 define the gap 718 therebetween. The gripping ring 700 can define the inner surface 712 defining the gripping ring bore 714 and extending from the first ring end 715 to the second ring end 716, the outer surface 713 extending from the first ring end 715 to the second ring end 716, the first end surface 725 (shown in FIG. 7), and the second end surface 726 (shown in FIG. 7).

The bridge 2000 can be positioned between the gasket 600 and the gripping ring 700. A first end 2015 can face the gasket, and a second end 2016 can face the gripping ring

700. The bridge 2000 can extend in a circumferential direction of each of the bridge 2000, the gasket 600, and the gripping ring 700. As shown, a tab 2020 can extend from a body 2010 of the bridge 2000. The tab 2020 can be sized and configured to fit inside the gap 718 of the gripping ring 700.

The gland 800 can define an annular shape in which the gland bore 814 can extend through the gland 800 from the first gland end 815 to the second gland end 816. The gland bore 814 can define the axis 801 extending from the first gland end 815 to the second gland end 816. The gland 800 can define the body 810. The vertical flange portion 820 of the gland 800 can define the plurality of fastener holes 828, which can extend through the vertical flange portion 820 as shown and will be further described below. The gland 800 can define the inner surface 812 defining the gland bore 814 and extending from the first gland end 815 to the second gland end 816, the outer surface 813 extending from the first gland end 815 to the second gland end 816, the first end surface 825 (shown in FIG. 23) defined by the first gland end 815, and the second end surface 826 defined by the second gland end 816.

As described above, the gland 800 can be interchangeably used with multiple piping elements 60 (shown in FIG. 1) by aligning the plurality of fastener holes 828 of the gland with the corresponding or matching plurality of mounting openings 98 (shown in FIGS. 3 and 4) of the piping element 60.

Figure 16:
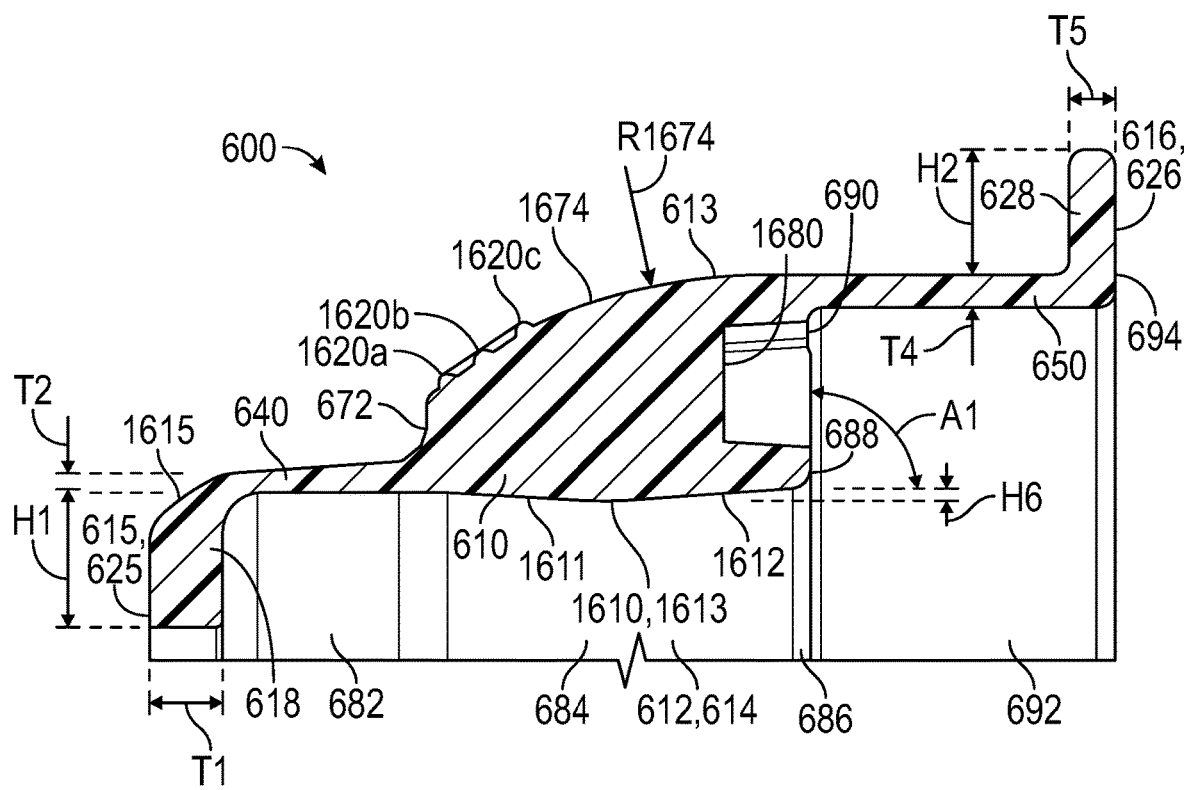
FIG. 16 is a sectional view of the gasket of FIG. 15 taken from line 16-16 of FIG. 15.

FIG. 16 is a sectional view of the gasket 600 of FIG. 15. In some aspects, as shown, the gasket 600 and any other components of the mechanical joint restraint 100 can comprise elements different from or of a different shape than those disclosed above. In some aspects, any of the previously disclosed elements can be combined with or incorporated into the gasket 600 shown, and any of the newly disclosed elements can be combined with or incorporated into the gasket 600 shown in FIG. 6.

As shown, the gasket 600 can comprise only the stop lips 618,628 and not the stop lip 638. The stop lip thickness T5 can be greater than either of the pipe collar thickness T2 and the ring collar thickness T4. An intersection between the stop lip 618 and the pipe collar 640 or a portion of the stop lip 618 at the first gasket end 615 can define an edge treatment 1615, which can define a radius or chamfer extending around a circumference of the gasket 600. The edge treatment 1615 can help guide the gasket 600 into the socket 400 (shown in FIG. 23) of the piping element 60 (shown in FIG. 23) during assembly of the mechanical joint 80 (shown in FIG. 23). Similarly, the pipe collar 640 can be tapered towards the first gasket end 615 of the gasket, i.e., the thickness T2 can decrease towards the first gasket end 615, to similarly help guide the gasket 600 into the socket 400 of the piping element 60 during assembly of the mechanical joint 80.

The outer surface 613 of the gasket 600—and in particular the sealing band 610—can define a radiused surface 1674 defining a radius R1674. The radiused surface 1674 can facilitate an improved seal with the socket 400 of the piping element 60. For example, when a portion of the radiused surface 1674 contacts the socket 400 of the piping element 60 before remaining portions of the radiused surface 1674 of the outer surface 613 of the gasket 600, that portion can function as a rib itself similar to the rib 1610 when defined in the inner surface 612. In some aspects, the groove angle A1, which can be defined between the horizontal and the angled surface 688 of the sealing band 610, can be a 90-degree angle. The angled surface 688 can define a cavity or recess 1680, which can be sized to receive the bridge 2000 (shown in FIG. 15). Wall surfaces of the recess 1680 can be drafted on one or more sides to facilitate, for example and without limitation, receipt of the bridge 2000 during assembly and/or fabrication of the gasket 600. The recess 1680 can define a depth D5 (shown in FIG. 17) measured in an axial direction of the gasket 600. The depth D5 can be sized to receive a full axial length or thickness in an axial direction 2001 (shown in FIG. 20) of the body 2010 of the bridge 2000.

In some aspects, as shown, the gasket 600 can define a rib 1610 on or in the inner surface 612 of the gasket 600. More specifically, the inner surface 612 of the gasket 600—and in particular the sealing band 610—can define the rib 1610 in the sealing band bore portion 684 of the gasket bore 614 between the pipe collar bore portion 682 and the transition edge 686. In some aspects, as shown, the rib 1610 and the sealing band bore portion 684 can define two portions 1611,1612 angled with respect to the axis 601 (shown in FIG. 15) in opposite directions from each other. The rib 1610 can define a peak 1613 defined between the portions 1611, 1612. In some aspects, as shown, either or both of the portions 1611,1612 can be conical or can be angled with respect to the axis 601 of the gasket 600. In some aspects, the portions 1611,1612 can be hyperbolic, convex, or otherwise rounded in cross section.

The outer surface 613 of the gasket 600 can define one or more ribs 1620*a,b,c* on or in the outer surface 613 of the gasket 600. The one or more ribs 1620*a,b,c* can be positioned on a portion of the outer surface 613 configured to contact and seal against the socket 400 of the piping element 60. As shown, the gasket 600 can define a plurality of the ribs 1620*a,b,c* on the outer surface 613. In some aspects, more specifically, the gasket 600 can define three ribs 1620*a,b,c* on the outer surface 613. In some aspects, the gasket 600 can define less than or more than the three ribs 1620*a,b,c* on the outer surface 613 as desired. One or more of the ribs 1620*a,b,c* can define a semi-circular shape in cross section and can define a height H7 (shown in FIG. 17). As will be described below, one or more ribs 1640 (shown in FIG. 17) can extend in an axial direction between the ribs 1620*a,b,c*. As shown, the one or more ribs 1640 can extend in an axial direction between each of the ribs 1620*a,b,c*.

Figure 17:
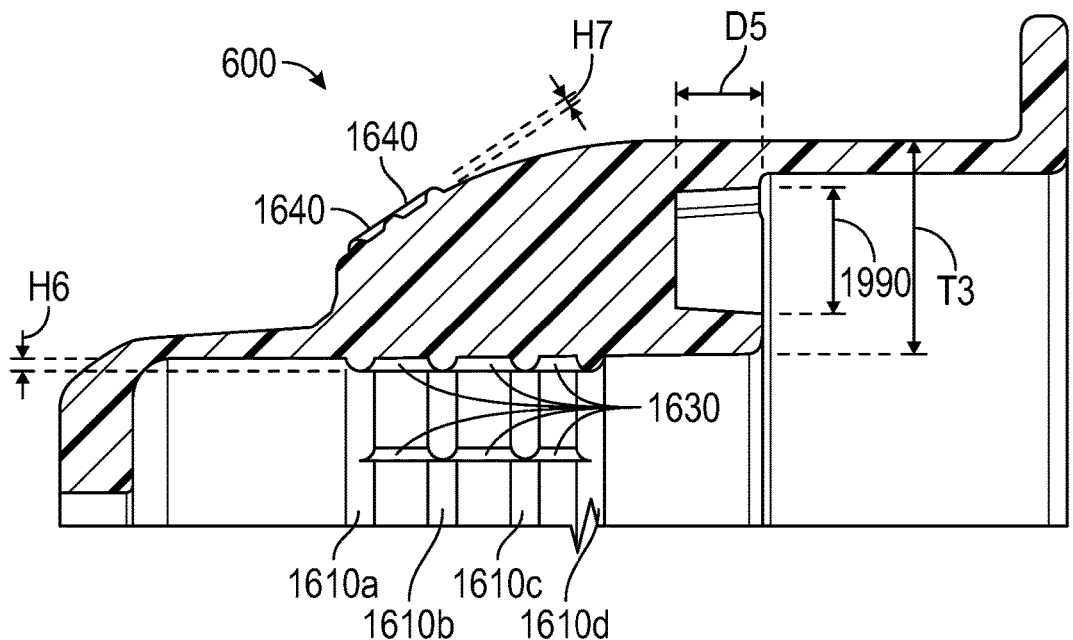
FIG. 17 is a sectional view of the gasket of FIG. 16 in accordance with another aspect of the current disclosure.
Figure 18:
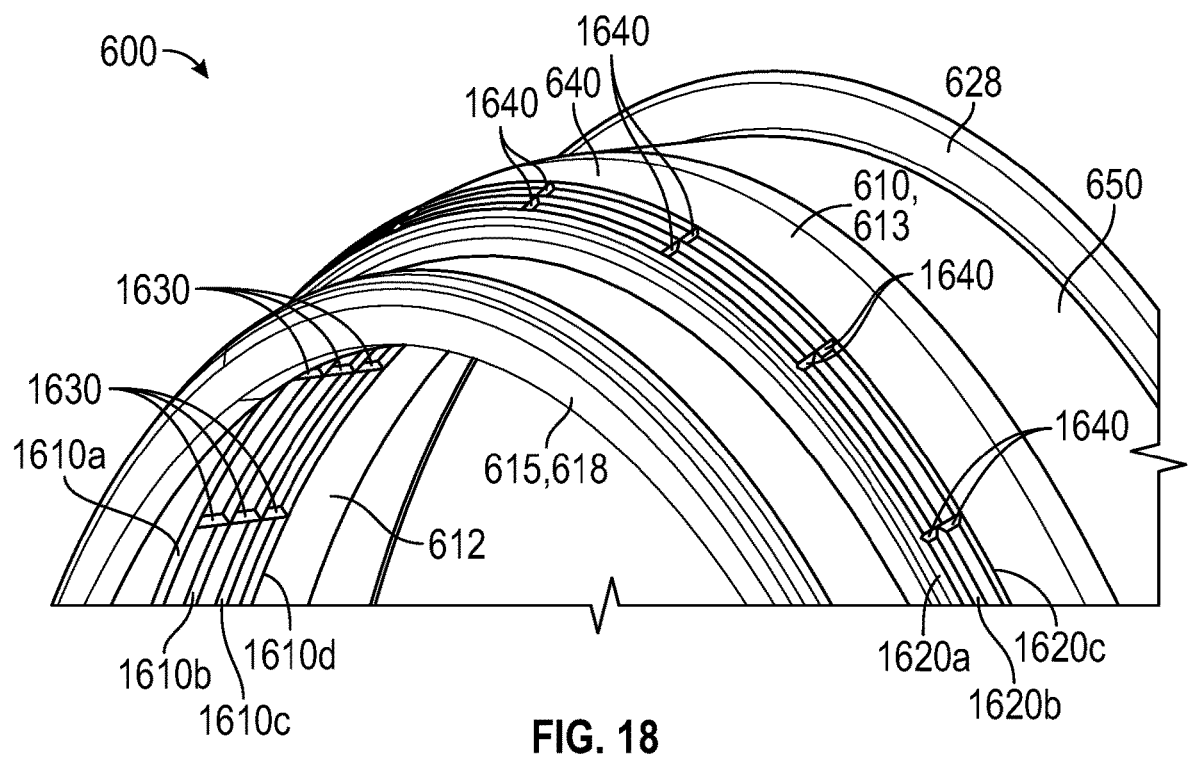
FIG. 18 is a detail perspective view of a first end of the gasket of FIG. 15.

FIG. 17 is a sectional view of the gasket 600 of FIG. 18 in accordance with another aspect of the current disclosure. In some aspects, as shown, the gasket 600 can define one or more ribs 1610*a,b,c,d* on or in the inner surface 612. More specifically, the inner surface 612 of the gasket 600—and in particular the sealing band 610—can define the rib or ribs 1610*a,b,c,d* in the sealing band bore portion 684 of the gasket bore 614 between the pipe collar bore portion 682 and the transition edge 686. As shown, the gasket 600 can define a plurality of the ribs 1610*a,b,c,d* on or in the inner surface 612. In some aspects, more specifically, the gasket 600 can define four ribs 1610*a,b,c,d* on the inner surface 612. In some aspects, the gasket 600 can define less than or more than the four ribs 1610*a,b,c,d* on the inner surface 612 as desired. One or more of the ribs 1610*a,b,c,d* can define a semi-circular shape in cross section and can define a height H6. As will be described below, one or more ribs 1630 can extend in an axial direction between the ribs 1610*a,b,c,d*. As shown, the one or more ribs 1630 can extend in an axial direction between each of the ribs 1610*a,b,c,d*. In some aspects, the ribs 1610*a,b,c,d* can be separated from each other on the inner surface 612 by a distance equal to between one rib diameter and two rib diameters. In some aspects, the ribs 1620*a,b,c* can be separated from each other on the outer surface 613 by a distance equal to between one rib diameter and two rib diameters. Such separation between the one or more ribs 1610a,b,c,d and the one or more ribs 1620a,b,c can permit not only the material forming the one or more ribs 1610a,b,c,d and the one or more ribs 1620a,b,c to "flow" or deform during compression but only the material forming the rest of the gasket.

FIG. 18 is a detail perspective view of the first gasket end 615 of the gasket 600 of FIG. 15. As shown, a plurality of the ribs 1620a,b,c can extend in a circumferential direction around a full circumference of the gasket 600 on the outer surface 613, and a plurality of the ribs 1640 can extend in an axial direction and intersect with the plurality of ribs 1620a,b,c. Similarly, as shown, a plurality of the ribs 1610a,b,c can extend in a circumferential direction around a full circumference of the gasket 600 on the inner surface 612, and a plurality of the ribs 1630 can extend in an axial direction and intersect with the plurality of ribs 1610a,b,c,d. The ribs 1630 and the ribs 1640, respectively, can be distributed not only between the ribs 1610a,b,c,d and the ribs 1620a,b,c but also at intervals in circumferential direction around the gasket 600. As shown, the ribs 1630 and the ribs 1640 can be distributed at regular intervals around the circumference of the gasket 600. The ribs 1630 and the ribs 1640, respectively, can improve strength of the ribs 1610a,b,c,d and the ribs 1620a,b,c by tying, respectively, the ribs 1610a,b,c,d and the ribs 1620a,b,c together. Just as adding supports under a bridge can limit deflection of any span of the bridge between the supports, tying the ribs 1610a,b,c,d together with the ribs 1630 can limit the deflection and potential deformation or even tearing of the ribs 1610a,b,c,d between the ribs 1630, which can be otherwise possible when assembling the mechanical joint restraint 100 to the piping element 60 and to the pipe length 70 because of sharp edges on the piping element 60 and/or the pipe length 70. Similarly, tying the ribs 1620a,b,c together with the ribs 1640 can limit the deflection and potential deformation or even tearing of the ribs 1620a,b,c between the ribs 1640. The ribs 1630,1640 can also trap water between the circumferential ribs 1610a,b,c,d and 1620a,b,c to further facilitate sealing between the gasket 600 and the piping element 60 and/or the pipe length 70.

Figure 19:
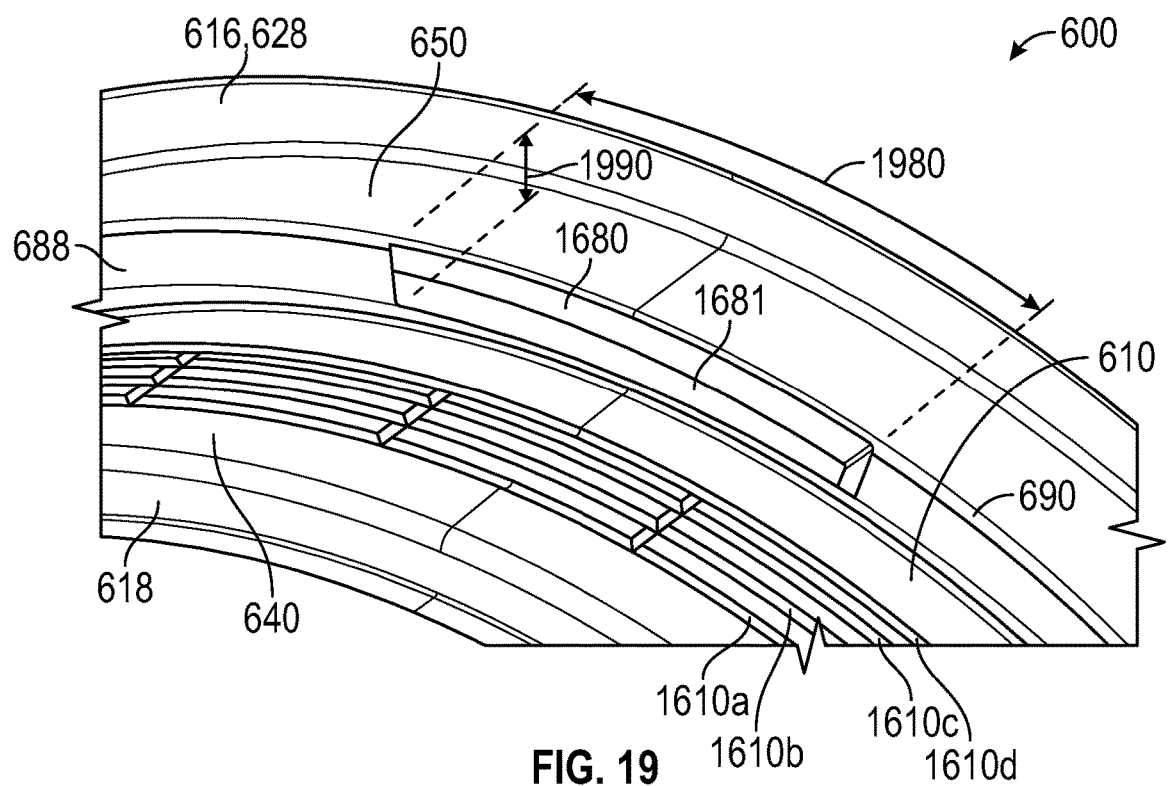
FIG. 19 is a detail perspective view of a second end of the gasket of FIG. 15.

FIG. 19 is a detail perspective view of the second gasket end 616 of the gasket 600 of FIG. 15 showing the recess 1680 in the angled surface 688. The recess 1680, which can extend in a circumferential direction around the gasket 600, can define a circumferential length 1980 and a radial height 1990. The recess 1680 can be positioned at any circumferential position on the gasket 600. The recess 1680 can define a bottom surface 1681.

FIGS. 20-22 show the bridge 2000. FIG. 20 is a first side view, FIG. 21 is a second side view, and FIG. 22 is a bottom view of the bridge 2000. The body 2010 can extend in a circumferential direction 2005 and the tab 2020 can extend from the body 2010 in the axial direction 2001 of the bridge 2000. In addition to the first end 2015 and the second end 2016 (shown in FIG. 21), the body 2010 can further define circumferential ends 2018,2019 (2019 shown in FIG. 22), opposite side surfaces 2011,2012 (2012 shown in FIG. 21), a radially inner surface 2013 (shown in FIG. 22), and a radially outer surface 2014. As shown in FIG. 22, the body 2010 of the bridge 2000 can define a circumferential length 2280 and a radial height 2290, which can be sized to be received within the recess 1680 of the gasket 600. In some aspects, the circumferential length 2280 and the radial height 2290 can be equal to or less than the respective circumferential length 1980 (shown in FIG. 19) and the radial height 1990 (shown in FIG. 19) of the recess 1680 (shown in FIG. 19) of the gasket 600 (shown in FIG. 19). In other aspects, the circumferential length 2280 and the radial height 2290 can be greater than the respective circumferential length 1980 and the radial height 1990 of the recess 1680 of the gasket 600, such as slightly greater to provide a tight fit to hold the bridge 2000 in place in the recess 1680. As also shown, the tab 2020 can define a thickness 2028, which can extend or be measured in a circumferential direction between opposite side surfaces 2021,2022 (2021 shown in FIG. 20), and an axial length 2025 extending in the axial direction 2001. The tab 2020 can be centered in the body 2010 in the circumferential direction 2005. Each of the body 2010 and the tab 2020 can define a rectangular shape in cross-section.

Figure 23:
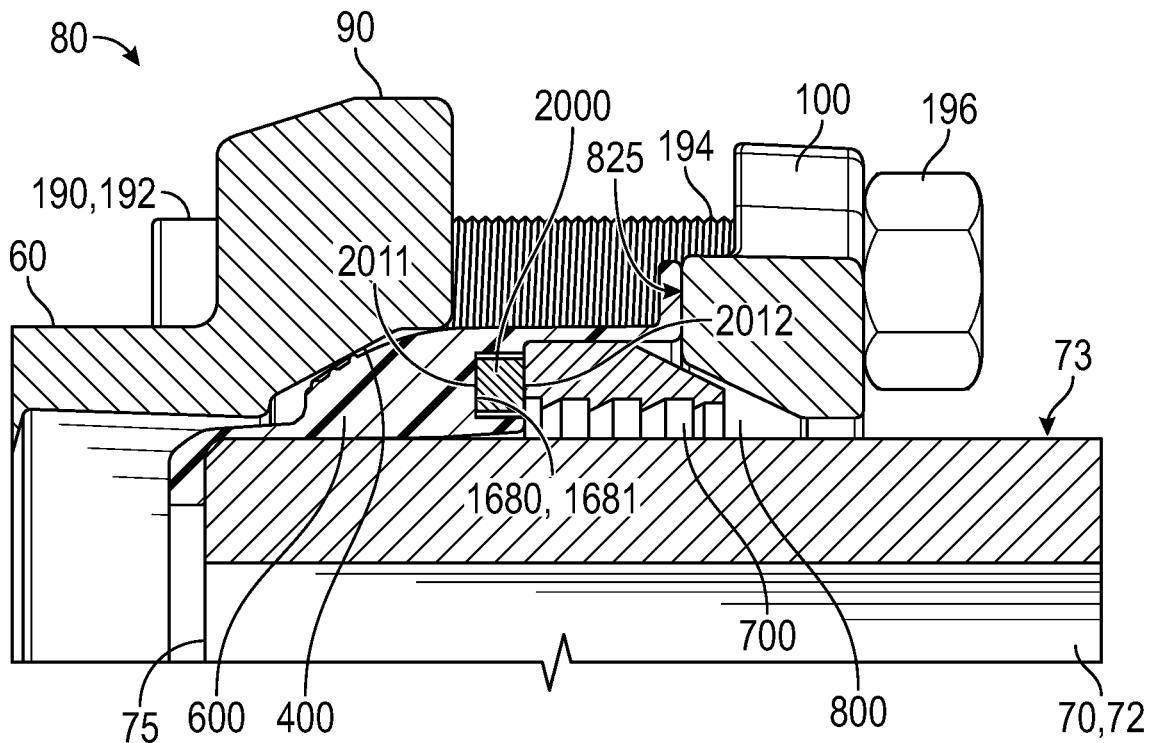
FIG. 23 is a detail sectional view of the mechanical joint of FIG. 1 comprising the mechanical joint restraint of FIG. 15 in an assembled but untightened condition similar to that taken from detail 13 of FIG. 11 but showing a cross-section of the mechanical joint restraint of FIG. 15 including a cross-section of the gripping ring of FIG. 15 at a position offset from a circumferential end of the gripping ring.
Figure 24:
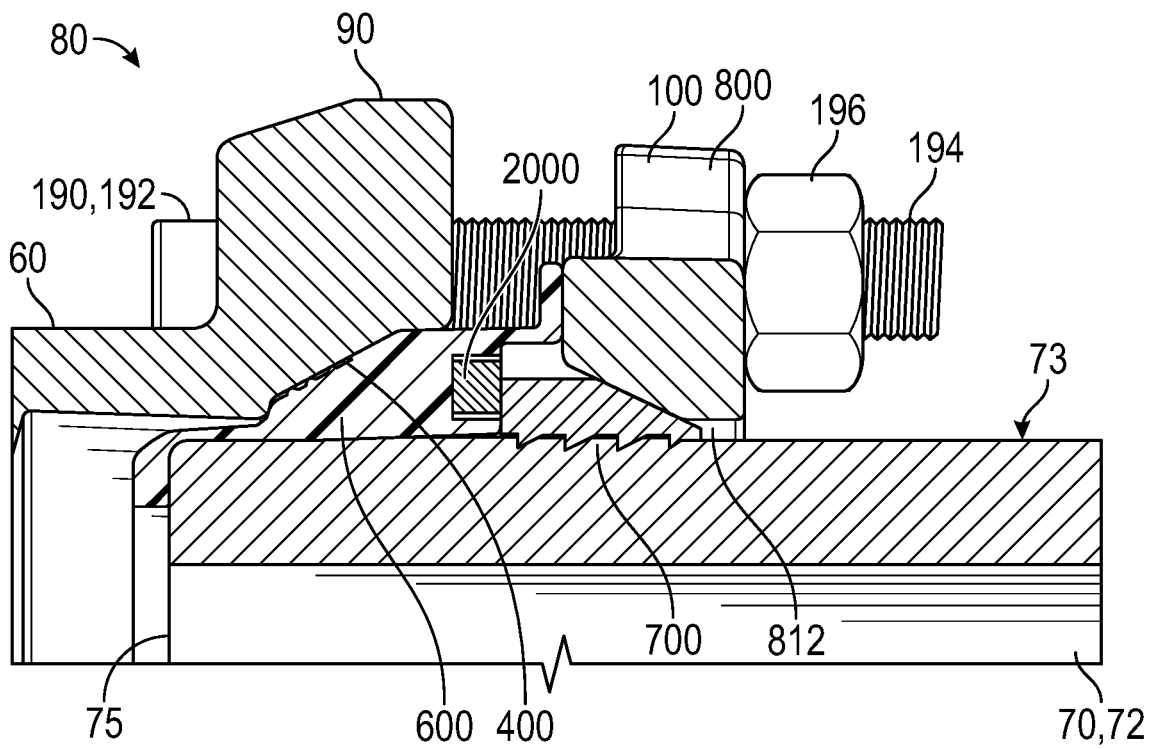
FIG. 24 is a detail sectional view of the mechanical joint of FIG. 23 in an assembled and tightened condition similar to that taken from detail 13 of FIG. 11.

FIG. 23 is a detail sectional view of the mechanical joint 80 comprising the mechanical joint restraint 100 of FIG. 15 in an assembled but untightened condition similar to that taken from detail 13 of FIG. 11, while FIG. 24 is a detail sectional view of the mechanical joint 80 of FIG. 23 in an assembled and tightened condition. In some aspects, after the mechanical joint restraint 100 is slipped over the end 75 of the pipe length 70, both the mechanical joint restraint 100 and the pipe length 70 can together be inserted into the socket 400 of the piping element 60. Similarly as described with respect to FIGS. 13 and 14, the fasteners 190 can then be tightened to pull the gland 800 towards the flange 90 of the piping element 60, thereby compressing the gasket 600 and the gripping ring 700 in a radial direction towards the pipe length 70. When compressing the gasket 600 into sealing engagement with the socket 400 and the outer surface 73 of the pipe length 70, positioning the bridge 2000 at the gap 718 (shown in FIG. 15) defined between the ends 717a,b (shown in FIG. 15) of the gripping ring 700 can ensure compression of the gasket 600 even at the gap 718 where no portion of the gripping ring 700 is present to push against the gasket 600. As the gripping ring 700 can slide along the inner surface 812 (shown in FIG. 8 with respect to another aspect of the gland 800) of the gland 800 and be radially compressed, the gripping ring 700 can also slide in a radial direction towards the outer surface 73 of the pipe length 70 along a surface of each of the bridge 2000 and the gasket 600. As discussed above, an inner diameter of the ring bore 714 of the gripping ring 700 can be reduced so that the gripping members 704 (shown in FIG. 14) engage the outer surface 73 of the pipe length 70.

In other aspects, as described above, the mechanical joint restraint 100 can be inserted into the socket 400 of the piping element 60, and then the end 75 of the pipe length 70 can be inserted into both the mechanical joint restraint 100 and also into the socket 400 of the piping element 60 and the resulting mechanical joint 80 tightened.

In yet other aspects, either the gasket 600 and the bridge 2000 or else the gasket 600, the bridge 2000, and the gripping ring 700 can first be inserted into the socket 400 of the piping element 60. Then either the gland 800 or both the gripping ring 700 and the gland 800 can be slipped over the end 75 of the pipe length 70. Then the end 75 of the pipe length 70—with either or both of the gripping ring 700 and the gland 800 already installed— can be inserted into either or both of the gasket 600 and the gripping ring 700 and also into the socket 400 of the piping element 60. As described above, the fasteners 190 can then be tightened to pull the gland 800 towards the flange 90 of the piping element 60, thereby compressing the gasket 600 and the gripping ring 700 in a radial direction towards the pipe length 70.

In some aspects, by tightening each of the fasteners 190 to a specified torque such as in the range of, for example and without limitation, 65-90 foot-pounds (approximately 88-122 Newton-meters), an increased pressure rating is possible with the gasket 600 comprising any of the rib 1610, the ribs 1610a,b,c,d, the ribs 1620a,b,c, the ribs 1630, and the ribs 1640. Increasing the pressure rating without increase the torque specification for the mechanical joint restraint 100 can be advantageous because increase torque requirements can mean special tools and additional clearance around the work area, which may not be available. In some aspects, incorporating the rib 1610 into the gasket 600 can increase the pressure rating from 380 psi (pounds per square inch) in a design without the rib 1610 or any other rib to 500 psi. In some aspects, incorporating the ribs 1610a,b,c,d into the gasket 600 can increase the pressure rating from 380 psi (pounds per square inch) without the rib 1610a,b,c,d or any other rib to 700 psi. One reason that the installation torque can be maintained while also increasing the pressure rating of the mechanical joint 80 is that it requires less force to compress ribs—especially narrower, localized ribs such as the one or more ribs 1610a,b,c,d or the one or more ribs 1620a,b,c—and also the ribs 1630,1640—than a wide smooth surface devoid of ribs. A standard installation torque applied to the mechanical joint 80 comprising a gasket defining the one or more ribs 1610a,b,c,d or the one or more ribs 1620a,b,c—with or without the ribs 1630,1640 can result in a higher localized pressure between the respective ribs and either the piping element 60 or the pipe length 70, which can thereby improve the seal and thus the pressure rating. In some aspects, the improved seal possible with the mechanical joint restraint 100 disclosed herein can make it possible to comply with long-term agency tests such as a 1000-hour UL sustained pressure test and can make it possible to obtain UL (Underwriter's Laboratories) and/or FM (Factory Mutual) approvals or achieve compliance with UL and/or FM standards. For example and without limitation, the disclosed mechanical joint restraint 1000 and any portion thereof or system of which it is a part can comply with any one or more of UL Standard 1285 (Standard for Pipe and Couplings, Polyvinyl Chloride, and Oriented Polyvinyl Chloride for Underground Fire Service), UL Standard 194 (Standard for Gasketed Joints for Ductile-Iron Pipe and Fittings for Fire Protection Service), and FM Standard 1620 (Pipe Joints and Anchor Fittings for Underground Fire Service Mains).

In some aspects, as shown, the body 2010 of the bridge 2000 can be positioned between the second gasket end 616 (shown in FIG. 16) of the gasket 600 and the first ring end 715 (shown in FIG. 7) of the gripping ring 700, and as shown in the exploded view of FIG. 15 the tab 2020 can extend into the gap 718. The bridge 2000 can be in contact with each of the pair of circumferential ends 717a,b of the gripping ring 700 and can extend in a circumferential direction of the gripping ring 700 across the gap 718 therebetween. In some aspects, at least a portion of the body 2010 of the bridge 2000 can be received within the recess 1680 defined in the second gasket end 616 of the gasket 600. More specifically, the surface 2011 of the body 2010 can contact a bottom surface 1681 of the recess 1680, and the surface 2012 of the body 2010 can contact the first ring end 715 of the gripping ring 700. In some aspects, as shown, a full depth in the axial direction 2001 of the bridge 200 can be received within the recess 1680 of the gasket 600. In some aspects, as also shown, at least a portion of the inner surface 812 of the gland 800 can define a cylindrical shape. When the definition of the cylindrical shape in the inner surface 812 of the gland 800 makes possible a larger depth or thickness of the gland 800 in the axial thickness—or a cross-section that otherwise has an increased moment of inertia able to more easily resist deflection or bending, especially of portions of the gland 800 between the fasteners 190, such reduced deflection of the gland during assembly of the mechanical joint 80 can further improve sealing. Use of the bridge 2000, because it can be received within only the recess 1680 of the gasket 600, can ensure a consistent orientation of the gripping ring 700 with respect to the gasket 600. In some aspects, the body 2010 of the bridge 2000 can be positioned between the second ring end 716 (shown in FIG. 7) of the gripping ring 700 and the first end 815 (shown in FIG. 8) of the gland 800, and the axial length 2025 (shown in FIG. 22) of the tab 2010 can extend a distance equal to an axial length of the gripping ring 700 in order to contact and support the gasket 600 upon assembly and tightening of the mechanical joint restraint 100.

A method of using the mechanical joint restraint 100 can comprise assembling the mechanical joint restraint 100 to each of a pipe length 70 and the socket 400 of the piping element 60. As described above, the gasket 600 can define a first gasket end 615 facing and engaging the socket and a second gasket end 616 positioned distal from the first gasket end 615 in an axial direction along the axis 101 of the mechanical joint restraint 100. The gland 800 can be positioned axially outward from the gasket 600 with respect to the first gasket end 615. The gripping ring 700 can be positioned between the gasket 600 and the gland 800 and can be a split ring defining the circumferential ends 717a,b and the gap 718 therebetween. The bridge 2000 can face and engage each of the circumferential ends 717a,b of the gripping ring 700 and can extend in a circumferential direction of the gripping ring 700 across the gap 718 therebetween. The method can comprise drawing the gland 800 of the mechanical joint restraint 100 towards a flange 90 of the piping element 60 to compress the gasket 600 into sealing engagement with each of the piping element 60 and the pipe length 70. A force resulting from movement of the gland 800 can transfer to an entire circumference of the gasket 600 by a surface of the gripping ring 700 such as the first end surface 725 (shown in FIG. 7) and a surface of the bridge 2000 such as the side surface 2011. By maintaining a force against the gasket 600 around the entire circumference of the gasket 600, such as with the bridge 2000, leakage can additionally be prevented—whether after initial assembly or over time due to lack of support on the gasket 600.

In some aspects, the method can comprise compressing the one or more ribs 1620a,b,c against the socket 400 of the piping element 60. In some aspects, the method can comprise compressing the rib 1610 or the one or more ribs 1610a,b,c,d against the outer surface 73 of the pipe length 70. In some aspects, the method can comprise compressing both the one or more ribs 1620a,b,c against the socket 400 of the piping element 60 and compressing the rib 1610 or the one or more ribs 1610a,b,c,d against the outer surface 73 of the pipe length 70.

When the gasket 600 defines the rib 1610 or the one or more ribs 1610a,b,c,d on the inner surface 612 of the gasket 600, the step of compressing the rib 1610 or the one or more ribs 1610a,b,c,d against the outer surface of the pipe length can comprise fixing a position of the respective rib 1610 or the one or more ribs 1610a,b,c,d of the gasket 600 with respect to the outer surface 73 of the pipe length 70 before contacting the pipe length 70 with a remaining portion of the inner surface 612 of the gasket 600. Fixing the position of the respective rib 1610 or the one or more ribs 1610a,b,c,d of the gasket 600 with respect to the outer surface 73 of the pipe length 70 before contacting the pipe length 70 with a remaining portion of the inner surface 612 of the gasket 600 can reduce or prevent inconsistent or nonuniform deformation of the gasket 600 during compression by compressing most of the gasket 600 only after the gasket is in contact with the pipe length 70 at the now fixed position of the rib 1610 or the one or more ribs 1610a,b,c,d. In some aspects, such fixing of the position of the rib 1610 or the ribs 1610a,b,c,d can make compression of the gasket more predictable. During compression of the gasket 600, fixing a position of the one or more ribs 1620a,b,c,d of the gasket 600 with respect to the socket 400 of the piping element 60 before contacting the socket 400 of the piping element 60 with a remaining portion of the outer surface 613 of the gasket 600 can have a similarly advantageous effect. In contrast, inconsistent or nonuniform deformation of the gasket 600 can reduce the effectiveness of the gasket 600 against the pipe length 70. The method can comprise stopping radial compression of the gripping ring 700 by preventing further movement of the circumferential ends 717a,b of the gripping ring 700 in a circumferential direction with the thickness 2028 of the tab 2020 positioned therebetween. The thickness 2028 can be made thicker or thinner to increase or decrease a minimum radius of the ring bore 714 of the gripping ring 700, which can prevent bottoming out of the gripping ring 700 on the pipe length 70, which can damage the pipe length 70, especially when formed from a softer material such as PVC. The method can comprise assembling the mechanical joint restraint 100 to each of the pipe length 70 and the socket 400 of the piping element 60 in a pre-assembled condition of the mechanical joint restraint 100.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A mechanical joint restraint comprising:
a gasket defining an inner surface and an outer surface, the inner surface defining a bore, the bore defining an axis therethrough, the gasket defining a first gasket end and a second gasket end;
a gland defining a bore defining an axis and positioned axially outward from the gasket with respect to the first gasket end with the mechanical joint restraint in an assembled condition, the axis of the gland aligned collinearly with the axis of the gasket;
a gripping ring positioned between the gasket and the gland, the gripping ring being a split ring defining a pair of circumferential ends and a gap therebetween; and
a bridge engaging each of the pair of circumferential ends of the gripping ring and extending in a circumferential direction of the gripping ring across the gap therebetween with the mechanical joint restraint in the assembled condition.

2. The mechanical joint restraint of claim 1, wherein the bridge comprises a body extending in the circumferential direction and a tab extending from the body in an axial direction of the gripping ring, the tab extending into the gap.

3. The mechanical joint restraint of claim 2, wherein the body of the bridge is positioned between the second gasket end of the gasket and a first end of the gripping ring.

4. The mechanical joint restraint of claim 3, wherein at least a portion of the body of the bridge is received within a cavity defined in the second gasket end of the gasket.

5. The mechanical joint restraint of claim 2, wherein the gasket defines the rib on the outer surface, the rib positioned on a portion of the outer surface configured to contact a socket of a piping element.

6. The mechanical joint restraint of claim 2, wherein the gasket defines the rib on the inner surface.

7. The mechanical joint restraint of claim 2, wherein the gasket defines a plurality of ribs on one of the inner surface and the outer surface.

8. The mechanical joint restraint of claim 2, wherein the gasket defines a plurality of ribs extending in a circumferential direction around a full circumference of the gasket.

9. The mechanical joint restraint of claim 8, wherein the plurality of ribs comprises a plurality of ribs extending in an axial direction and intersecting with the plurality of ribs extending in the circumferential direction.

10. The mechanical joint restraint of claim 9, wherein each of the plurality of ribs defines a semi-circular shape in cross section.

11. The mechanical joint restraint of claim 1, wherein the gasket defines a rib on one of an inner surface and an outer surface of the gasket.

12. The mechanical joint restraint of claim 1, wherein an inner surface of the gland defines a cylindrical shape.

13. A mechanical joint comprising:
a piping element comprising a flange and defining a socket;
a pipe length positioned inside the socket;
a mechanical joint restraint securing the pipe length to the piping element, the mechanical joint restraint comprising a gasket defining an inner surface and an outer surface, the inner surface defining a bore, the bore defining an axis therethrough, the gasket defining a first gasket end and a second gasket end, the gasket defining a rib on one of the inner surface and the outer surface of the gasket;
a gland;

a gripping ring positioned between the gasket and the gland with the mechanical joint restraint in an assembled condition, the gripping ring being a split ring defining a pair of circumferential ends; and a bridge in contact with each of the pair of circumferential ends of the gripping ring and extending in a circumferential direction of the gripping ring.

14. The mechanical joint of claim 13, wherein the bridge comprises a body extending in the circumferential direction and a tab extending from the body in an axial direction of the gripping ring.

15. The mechanical joint of claim 14, wherein the pair of circumferential ends defines a gap therebetween, the tab of the bridge extending into the gap.

16. A method of using a mechanical joint restraint, the method comprising:

assembling the mechanical joint restraint to each of a pipe length and a socket of a piping element, the mechanical joint restraint defining an axis and comprising:

a gasket defining a first gasket end engaging the socket and a second gasket end positioned distal from the first gasket end in an axial direction along the axis of the mechanical joint restraint;

a gland positioned axially outward from the gasket with respect to the first gasket end;

a gripping ring positioned between the gasket and the gland, the gripping ring being a split ring defining a pair of circumferential ends and a gap therebetween; and a bridge engaging each of the pair of circumferential ends of the gripping ring and extending in a circumferential direction of the gripping ring across the gap therebetween; and drawing the gland of the mechanical joint restraint towards a flange of the piping element to compress the gasket into sealing engagement with each of the piping element and the pipe length, a force resulting from movement of the gland being transferred to an entire circumference of the gasket by a surface of the gripping ring and a surface of the bridge.

17. The method of claim 16, wherein the gasket defines a rib on one of an inner surface and an outer surface of the gasket, the method further comprising compressing the rib against one of the socket of the piping element and an outer surface of the pipe length.

18. The method of claim 17, wherein the gasket defines the rib on the inner surface of the gasket, the method further comprising compressing the rib against the outer surface of the pipe length, wherein compressing the rib against the outer surface of the pipe length comprises fixing a position of the rib of the gasket with respect to the outer surface of the pipe length before contacting the pipe length with a remaining portion of the inner surface of the gasket.

19. The method of claim 16, wherein the bridge comprises a body extending in the circumferential direction and a tab extending from the body in an axial direction of the gripping ring, the tab extending into the gap, the method further comprising stopping radial compression of the gripping ring by preventing further movement of the circumferential ends of the gripping ring in a circumferential direction with the tab positioned therebetween.

20. The method of claim 16, wherein the mechanical joint restraint is in a pre-assembled condition when assembling the mechanical joint restraint to each of the pipe length and the socket of the piping element.

\* \* \* \* \*